(12) United States Patent
Nakashima

(10) Patent No.: US 11,089,178 B2
(45) Date of Patent: Aug. 10, 2021

(54) INFORMATION PROCESSING SYSTEM AND CONTROL METHOD FOR SEARCHING FOR DOCUMENTS MANAGED BY A MANAGEMENT SYSTEM

(71) Applicant: CANON KABUSHIKI KAISHA, Tokyo (JP)

(72) Inventor: Kazuya Nakashima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/378,189

(22) Filed: Apr. 8, 2019

(65) Prior Publication Data

US 2019/0320080 A1 Oct. 17, 2019

(30) Foreign Application Priority Data

Apr. 11, 2018 (JP) .............................. JP2018-076458

(51) Int. Cl.
| | |
|---|---|
| *G06F 13/14* | (2006.01) |
| *H04N 1/21* | (2006.01) |
| *H04N 1/00* | (2006.01) |
| *G06F 16/93* | (2019.01) |

(52) U.S. Cl.
CPC .......... *H04N 1/2179* (2013.01); *G06F 16/93* (2019.01); *H04N 1/00225* (2013.01); *H04N 1/00244* (2013.01); *H04N 1/00413* (2013.01); *H04N 2201/0018* (2013.01); *H04N 2201/0039* (2013.01)

(58) Field of Classification Search
CPC ..... H04N 1/00244; G06F 16/93; G06F 16/58; G06F 16/538
USPC ................................................. 358/1.15, 403
See application file for complete search history.

(56) References Cited

U.S. PATENT DOCUMENTS

| | | | | |
|---|---|---|---|---|
| 2005/0257126 A1* | 11/2005 | Hagiuda | ................. | H04L 51/14 715/273 |
| 2006/0221357 A1* | 10/2006 | Uzawa | ............... | G06K 9/00463 358/1.1 |
| 2014/0233053 A1* | 8/2014 | Kakutani | .............. | G06F 3/1285 358/1.14 |

FOREIGN PATENT DOCUMENTS

JP  2015-228212 A  6/2017

\* cited by examiner

*Primary Examiner* — Jamares Q Washington

(74) *Attorney, Agent, or Firm* — Canon U.S.A., Inc. IP Division

(57) ABSTRACT

A notification that scan data identified by an identifier transmitted to a document management system is registered in the document management system is made as a notification screen. The notification screen is transitioned to an edit screen for editing the scan data identified by the identifier.

16 Claims, 19 Drawing Sheets

FIG.4
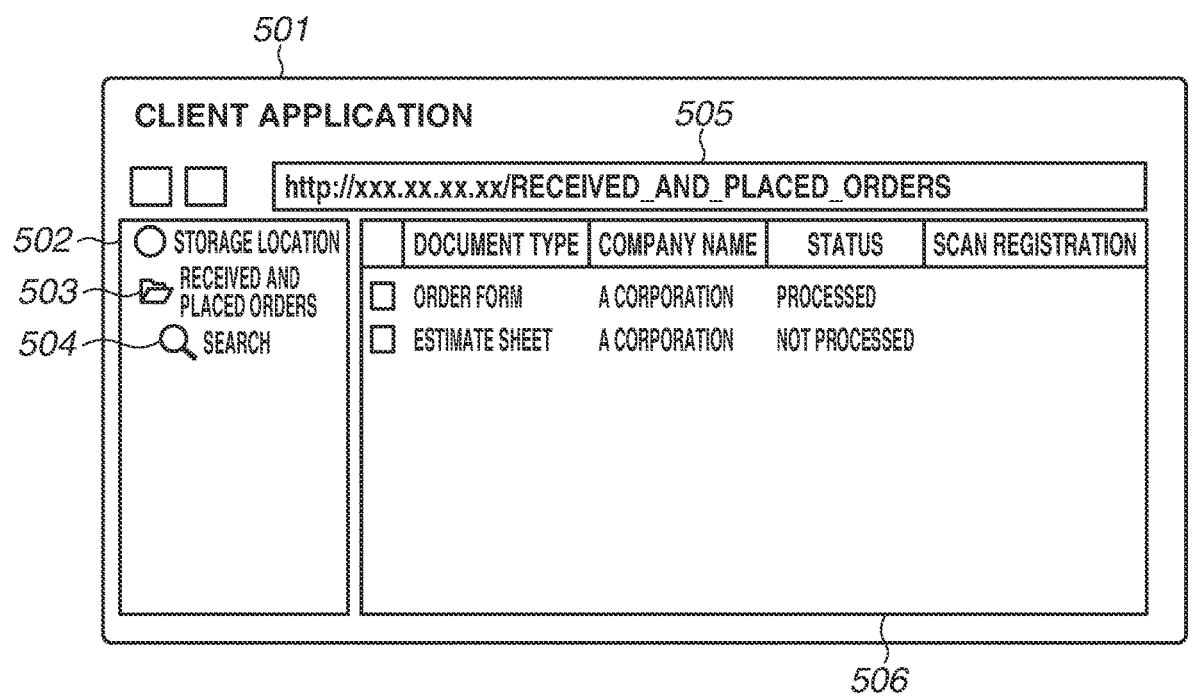
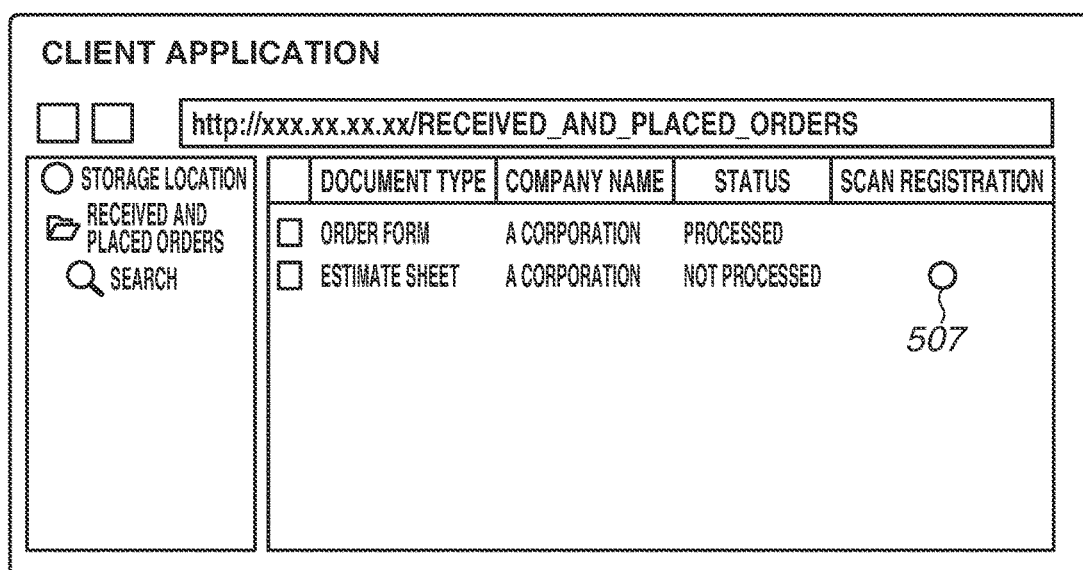

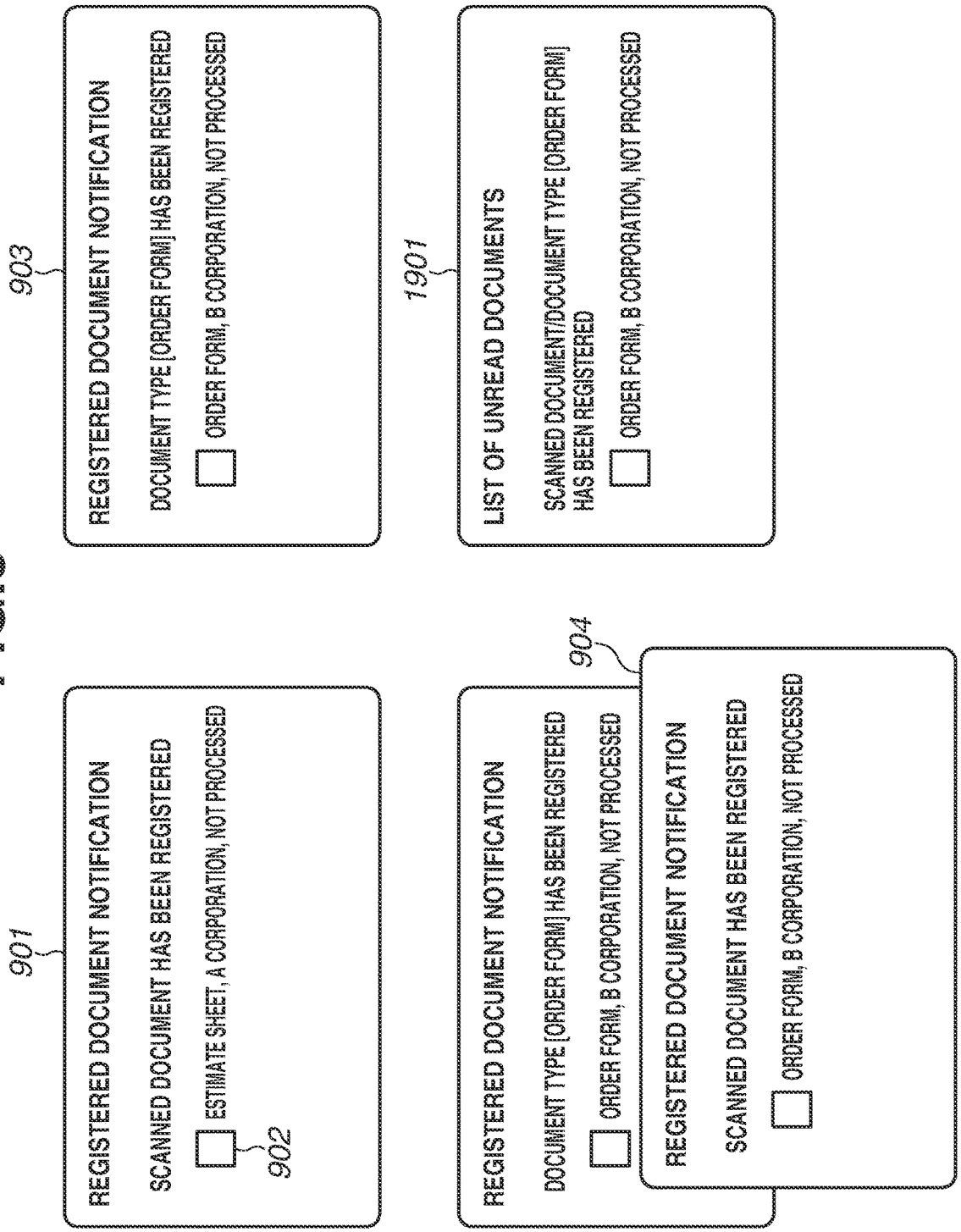

FIG.9A

MENU — 1001

COPY — 1002
SCAN AND SEND — 1003
SCAN AND REGISTER IN DOCUMENT MANAGEMENT SYSTEM — 1004

FIG.9B

SCAN AND REGISTER IN DOCUMENT MANAGEMENT SYSTEM — 1101

USER NAME
PASSWORD

LOGIN — 1102
CANCEL — 1103

FIG.9C

SCAN AND REGISTER IN DOCUMENT MANAGEMENT SYSTEM — 1201

PLACE DOCUMENT

START SCAN — 1202
CANCEL — 1203

FIG.9D

SCAN AND REGISTER IN DOCUMENT MANAGEMENT SYSTEM — 403
RECEIVED AND PLACED ORDER STORAGE AREA — 1302

| DOCUMENT TYPE | COMPANY NAME | STATUS |
|---|---|---|
| ESTIMATE SHEET | A CORPORATION | |

— 1303

ESTIMATE SHEET

A CORPORATION
XX-XX OTA-KU, TOKYO

| PRODUCT NUMBER/ PRODUCT NAME | QUANTITY | UNIT PRICE |
|---|---|---|
| DEVELOPMENT COST FOR PRODUCT X | 1 | 1000000 |

REGISTRATION — 1309
CANCEL — 1310

← 1304
+ 1306
− 1307
→ 1305

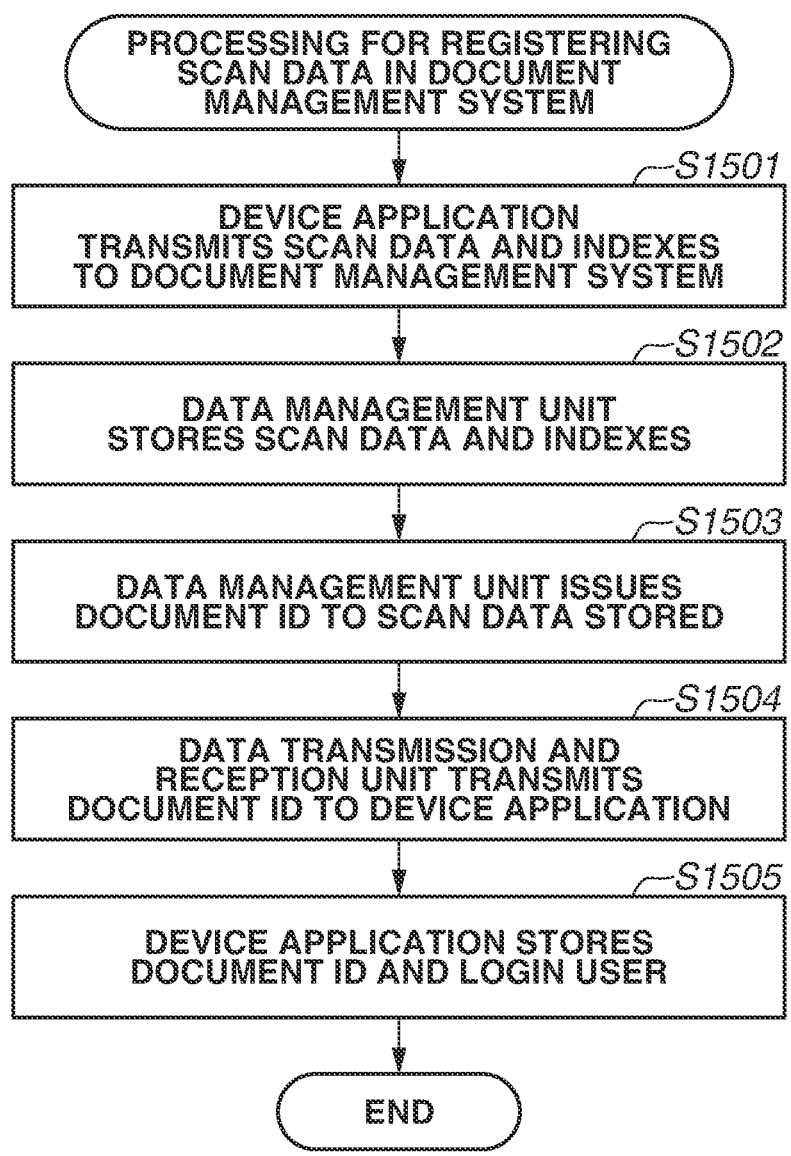

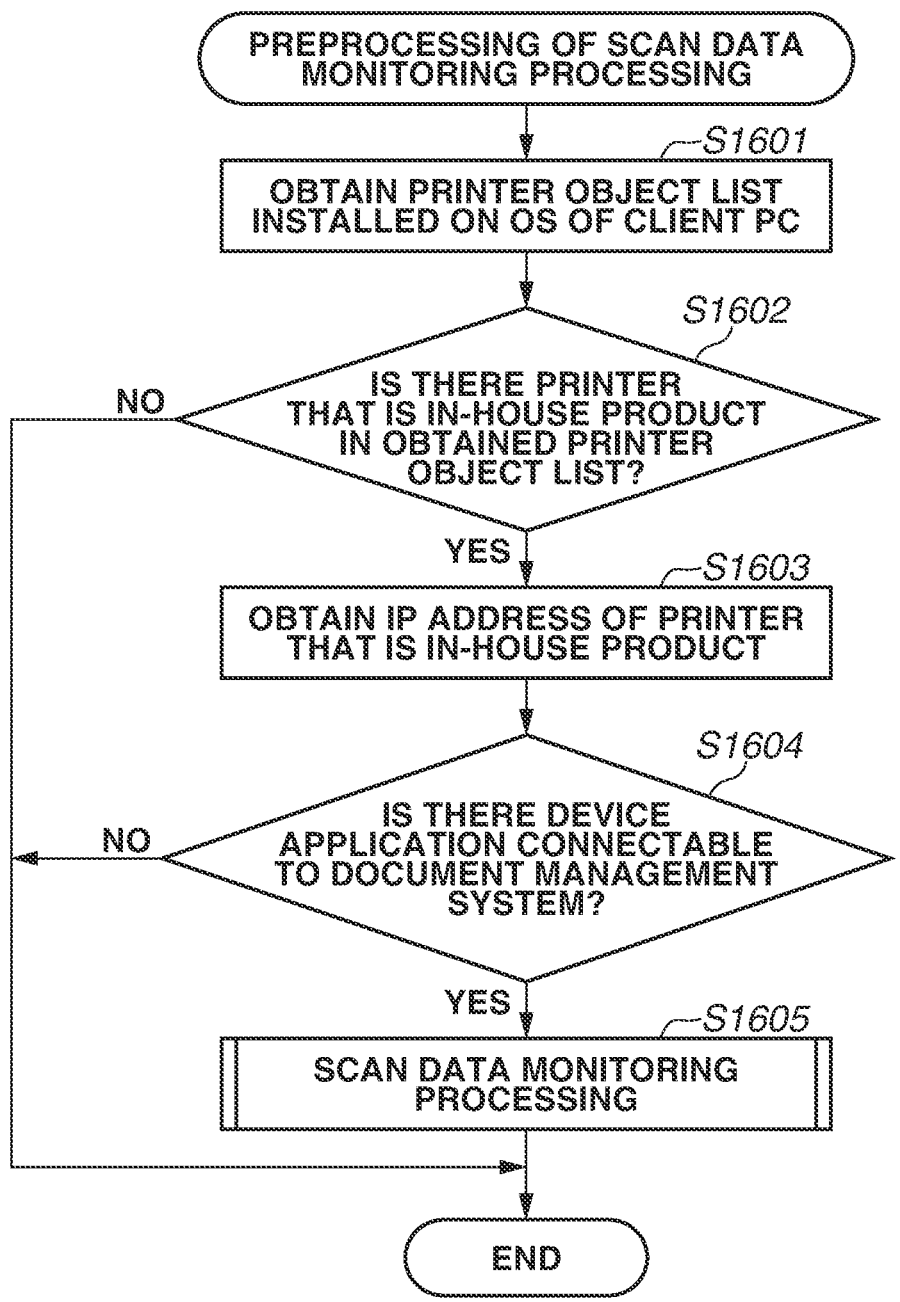

FIG.14

INFORMATION PROCESSING SYSTEM AND CONTROL METHOD FOR SEARCHING FOR DOCUMENTS MANAGED BY A MANAGEMENT SYSTEM

BACKGROUND OF THE INVENTION

Field of the Invention

The present disclosure relates to an information processing system and a control method for searching for documents managed by a document management system.

Description of the Related Art

Document management systems that manage documents by storing digitized scan data on various paper documents created for businesses and document data generated by applications have conventionally been used in offices. Some document management systems use a method of managing documents by using indexes attached to documents. By such a method, documents can be registered without using a hierarchical folder structure, and the indexes are used to search for a desired document.

In browsing and registering documents managed in a document management system, a client application installed on a client personal computer (PC) is used. Japanese Patent Application No. 2015-228212 discusses a function by which a client application monitors a document management system and makes a notification when a document that satisfies a specific condition is registered.

SUMMARY OF THE INVENTION

According to an aspect of the present disclosure, an information processing system includes a device having a scan function of scanning a document, and a client configured to display information about scan data obtained by the scan function, the scan data being managed by a document management system, wherein the device includes a first acquisition unit configured to acquire an identifier of the scan data in response to registration of the scan data in the document management system, the identifier being issued by the document management system, wherein the client includes a second acquisition unit configured to acquire the identifier from the device, a transmission unit configured to transmit the identifier acquired by the second acquisition unit to the document management system, and a notification unit configured to provide a notification, as a notification screen, that the scan data identified by the identifier transmitted by the transmission unit is registered in the document management system, and wherein the information processing system is configured to transition a screen from the notification screen provided by the notification unit to an edit screen for editing the scan data identified by the identifier.

Further features of the present disclosure will become apparent from the following description of exemplary embodiments with reference to the attached drawings.

BRIEF DESCRIPTION OF THE DRAWINGS

FIG. 4 is a diagram illustrating examples of a user interface (UI) of a client application.

FIG. 8 is a diagram illustrating examples of a UI of a document registration notification window of the client application.

FIGS. 9A to 9D are diagrams illustrating examples of a screen UI of a device application.

FIG. 10 is a flowchart illustrating processing for registering scan data in the document management system by the device application.

FIG. 11 is a flowchart illustrating preprocessing of scan data monitoring processing.

FIG. 14 illustrates an example of a scan data edit screen.

DESCRIPTION OF THE EMBODIMENTS

Among device applications included in a multifunction peripheral (MFP) is one having a function of performing character analysis on scan data obtained by the MFP and storing an analyzed character string as an index into a document management system in association with the scan data. When the scan data is stored in the document management system, it is sometimes desired that a client personal computer (PC) issue a notification of the storing of the scan data by using a function of a client application such as discussed in Japanese Patent Application No. 2015-228212. There is a demand to transition a screen directly from a notification screen to an edit screen for editing the corresponding scan data.

Some document management systems managing not only scan data but also other document data have no function of recognizing which piece of data is scan data. As a result, it can be difficult to register scan data as a condition for notification and obtain document data recognized as scan data from the document management systems.

According to an exemplary embodiment of the present disclosure, a user is automatically notified that scan data is registered in a document management system, and a screen is transitioned from a notification screen to a screen for editing the scan data.

Exemplary embodiments of the present disclosure will be described below with reference to the drawings.

<System Configuration>

Figure 1:
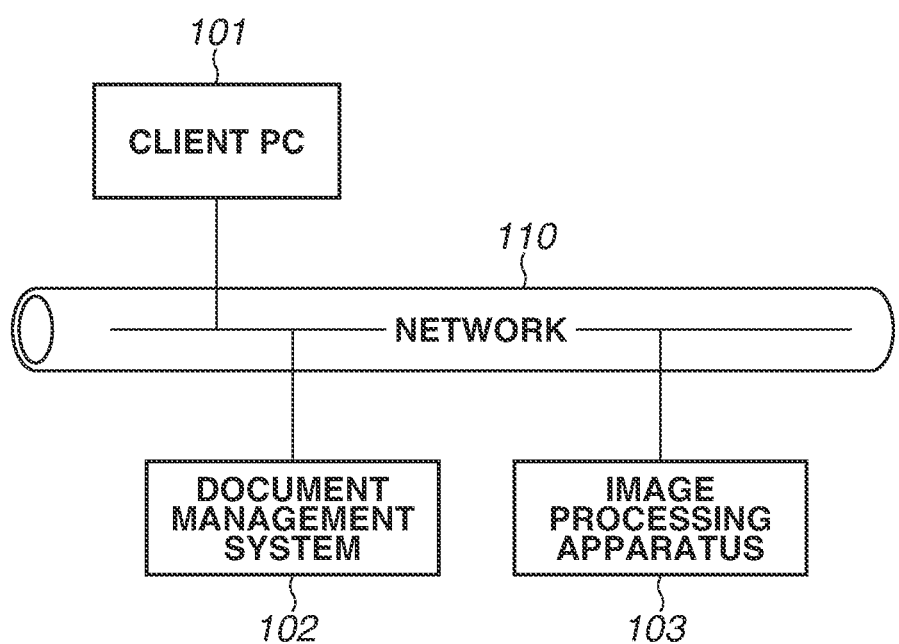
FIG. 1 is a diagram illustrating a system configuration.

A first exemplary embodiment will be described. FIG. 1 is a configuration diagram of a system including an information processing system and a document management system 102 according to the present exemplary embodiment.

In FIG. 1, a client personal computer (PC) 101, a document management system 102, and an image processing apparatus 103 are connected via a network 110. The client PC 101 and the document management system 102 may each include a plurality of units. For example, the network 110 is any one of the Internet, a local area network (LAN), a wide area network (WAN), a telephone line, and a dedicated digital line, or a communication network implemented by a combination of these. The network 110 may be a wired or wireless one as long as data can be transmitted and received. The client PC 101 includes a built-in environment for executing programs such as an office application and a printer driver. Examples of the client PC 101 include a desktop PC, a notebook PC, a mobile PC, a tablet terminal, and a smartphone including a built-in program execution environment. The document management system 102 has a function of managing documents, and the client PC 101 can access the stored documents via the network 110. The function of the document management system 102 may be implemented by a plurality of servers or by a single server. The image processing apparatus 103 has a plurality of functions such as a scan function and a copy function.

<Hardware Configuration>

Figure 2:
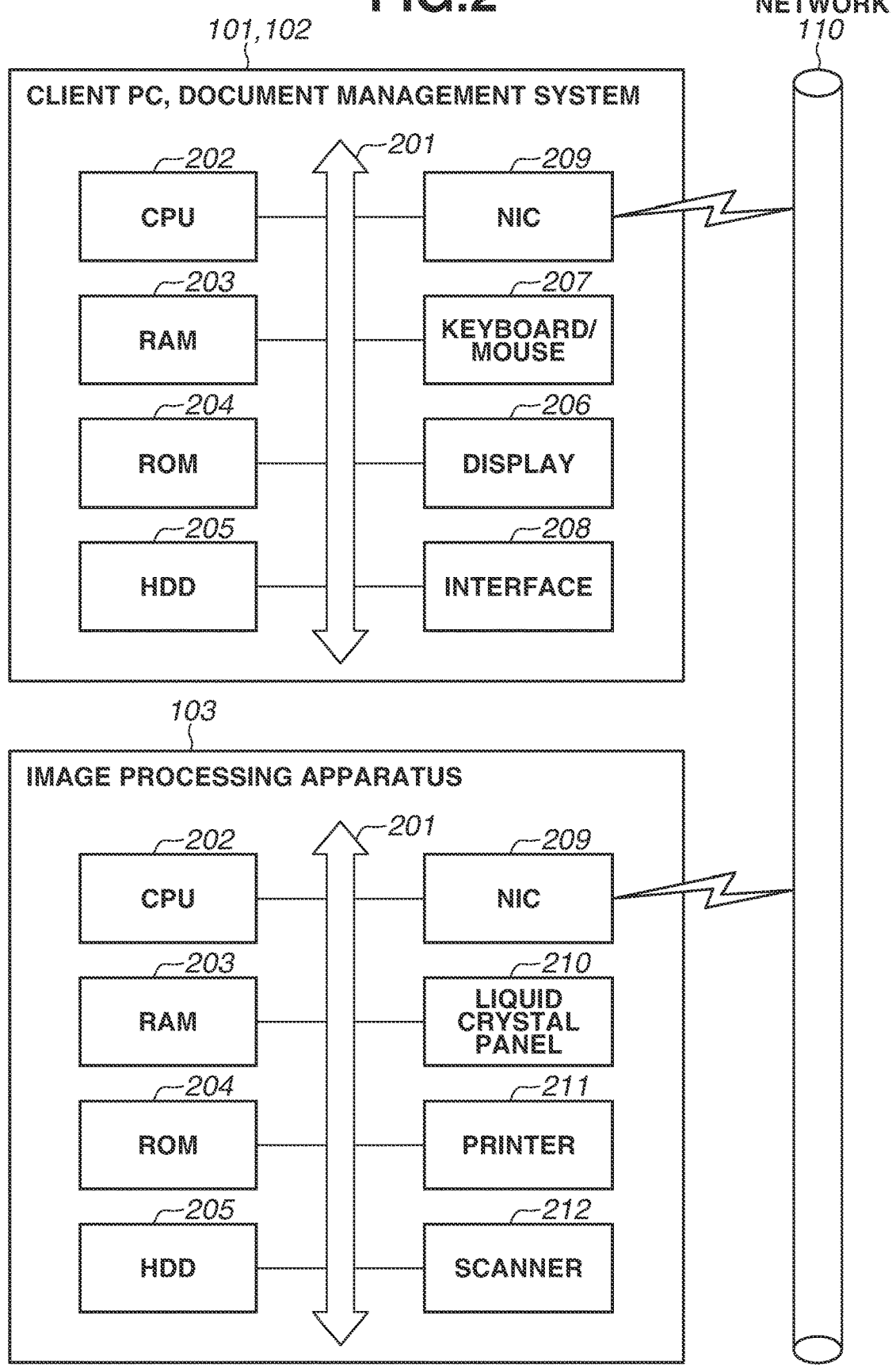
FIG. 2 is a diagram illustrating a hardware configuration of a client personal computer (PC), a document management system, and an image processing apparatus.

FIG. 2 is a hardware configuration diagram of the client PC 101, the document management system 102, and the image processing apparatus 103 according to the present exemplary embodiment.

A central processing unit (CPU) 202 controls the entire apparatus. The CPU 202 executes application programs and an operating system (OS) stored in a hard disk (hard disk drive (HDD)) 205, and performs control to temporarily store information needed for program execution and documents into a random access memory (RAM) 203. A read-only memory (ROM) 204 is a storage unit and stores various types of data including a basic input/output (I/O) program. The RAM 203 is a temporary storage unit and functions as a main memory and a work area of the CPU 202. The HDD 205 is one of external storage units. The HDD 205 functions as a mass memory and stores application programs such as an office application and a web browser, as well as the OS and related programs.

A display 206 is a display unit of the client PC 101 or the document management system 102. The display 206 displays commands input from a keyboard/mouse 207. An interface 208 is an external device interface (I/F) and connects Universal Serial Bus (USB) devices and peripheral devices. The keyboard/mouse 207 is an instruction input unit. A system bus 201 governs data flow inside the apparatus.

A CPU, a RAM, a ROM, an HDD, and a system bus of the image processing apparatus 103 have typical functions similar to those of the client PC 101 and the document management system 102. Such components are designated by the same reference numerals, and a detailed description thereof will be omitted.

A network interface card (NIC) 209 exchanges data with an external apparatus via the network 110. The foregoing configuration of the client PC 101 and the document management system 102 is just an example, and the configuration of the client PC 101 and the document management system 102 is not limited to the configuration example of FIG. 2. For example, the storage locations of data and programs may be changed between the ROM 204, the RAM 203, and the HDD 205 depending on the characteristics of the data and programs. In the following exemplary embodiment, various types of processing are implemented by loading programs stored in the ROM 204 into the RAM 203 and executing the programs by the CPU 202 unless otherwise specified. A liquid crystal panel 210 is a display unit and an instruction input unit of the image processing apparatus 103. A printer 211 is a device for outputting electronic data onto a sheet of paper. A scanner 212 is a device for reading a document and has an automatic document feeder function. The scanner 212 reads a document and generates image data (scan data).

<Software Configuration>

Figure 3:
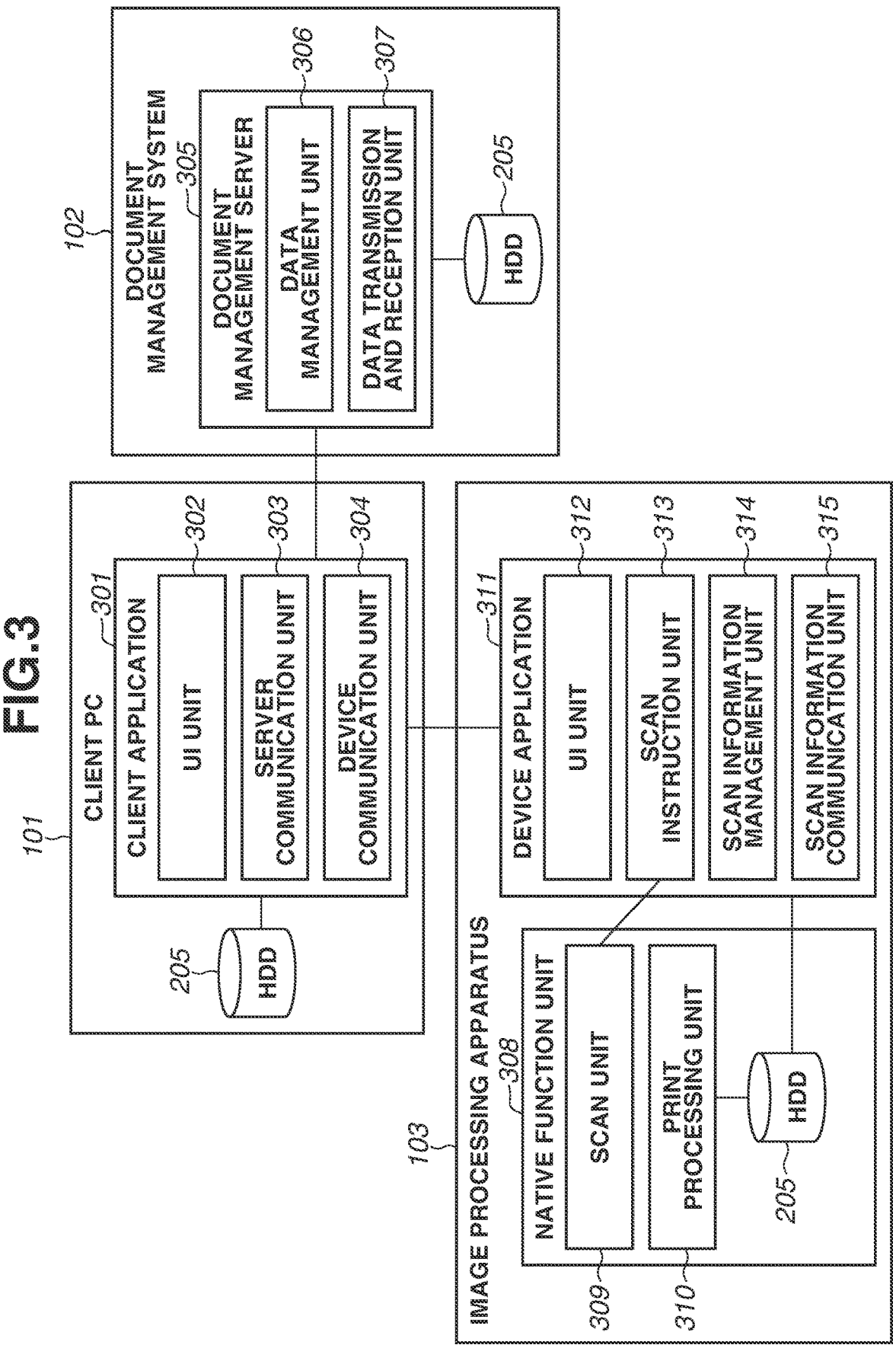
FIG. 3 is a diagram illustrating a software configuration.

FIG. 3 is a block diagram illustrating a software configuration of the client PC 101, the document management system 102, and the image processing apparatus 103 illustrated in FIG. 1.

A client application 301 is an application that enables cooperation with a document management server 305 and the image processing apparatus 103. The client application 301 includes functional units such as a user interface (UI) unit 302, a server communication unit 303, and a device communication unit 304. The UI unit 302 has a function of controlling a UI for displaying a document list and operating documents. The server communication unit 303 has a function of communicating with the document management server 305 belonging to the document management system 102 and performing processing for registering documents and obtaining documents. The device communication unit 304 has a function of communicating with a device application 311 of the image processing apparatus 103 and performing processing for obtaining scan data information.

The document management server 305 manages documents by using indexes. A data management unit 306 plays the role of managing documents registered in the document management server 305. A data transmission and reception unit 307 has a function of transmitting and receiving a document in a case where a document registration or acquisition command is given to the document management server 305. For convenience of description, all interactions between the client PC 101 and the image processing apparatuses 103 will hereinafter be referred to as being performed by the "document management system 102".

The image processing apparatus 103 includes a native function unit 308 and the device application 311. The native function unit 308 is in charge of fundamental functions of the image processing apparatus 103. A scan unit 309 performs processing for digitizing a document read by the scanner 212. A print processing unit 310 performs processing for outputting an electronic document to the printer 211. The device application 311 performs processing for registering scan data in the document management system 102. A UI unit 312 controls a UI in previewing scan data and registering document data in the document management system 102. A scan instruction unit 313 instructs the scan unit 309 to start execution of a scan. A scan information management unit 314 is in charge of the management of information about scan data captured by the scan instruction unit 313 through execution of a scan (for example, attribute information such as an index) and information about a document in registering document data in the document management system 102 (for example, identifier of scan data). A scan information communication unit 315 performs processing for transmitting scan data and its indexes to the document management system 102 and the client application 301.

<Index List Managed by Document Management System>

Table 1 shows an example of an index list managed by the document management system 102. The index list of Table 1 is stored in the HDD 205. The data management unit 306 manages the stored index list.

TABLE 1

Index List Managed by Document Management System 102

| Document ID | Document type | Company name | Status |
|---|---|---|---|
| 000001 | Older form | A Corporation | Processed |
| 000002 | Older form | B Corporation | In process |
| 000003 | Estimate sheet | A Corporation | Not processed |

Table 1 includes a "document identifier (ID)", a "document type", a "company name", and a "status". The "document ID" shows IDs that uniquely identify documents managed by the document management system 102. The "document type", "company name", and "status" are indexes of the documents. The "document type" is an index indicating a type of a document. The "company name" is an index indicating a name of a company from/for which an order is received/placed. The "status" is an index indicating a state as to whether processing such as content confirmation and return of the document has been performed. The document management system 102 thus manages the document IDs and the indexes in association with each other. The indexes are information previously set by the user in the document management system 102. A concrete description of the setting method is omitted here.

<Client Application UI>

FIG. 4 is a diagram schematically illustrating a main UI 501 that is a display screen of the client application 301. A document storage location 502 is an area in which storage locations of documents registered via the client application 301 are listed. As an example of a storage location, a storage area 503 managed by the document management system 102 is displayed here. The storage area 503 is defined by the user in advance. A storage area defined as "received and placed orders" is displayed here.

A search execution UI 504 is an UI for displaying a search dialog 701 (to be described below) for searching for documents managed in the storage area 503. An address display area 505 displays an address path of the storage area (here, storage area 503) selected in the document storage location 502. A list of pieces of document information about the documents in the storage area selected by the document storage location 502 or documents resulting from a search of the storage area is displayed in a list display area 506. In the present exemplary embodiment, document information refers to attribute information about documents stored in a storage area. The document information includes indexes. In the present exemplary embodiment, the indexes of documents are mainly displayed in the list display area 506. In FIG. 4, documents with "A Corporation" in the "company name" index are displayed as search results. A "scan registration" field will be described below.

Figure 5:
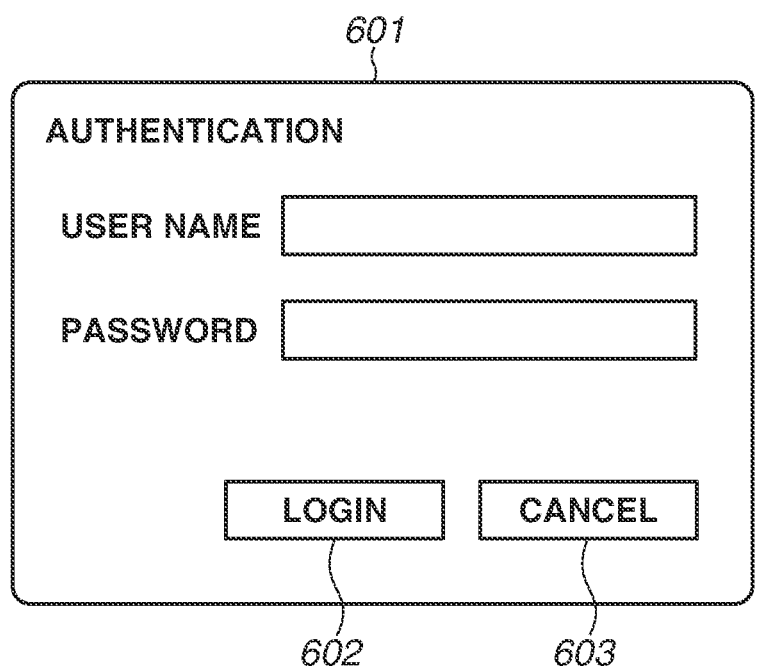
FIG. 5 is a diagram illustrating an example of a UI of an authentication dialog of the client application for a document management system.

FIG. 5 illustrates an example of an authentication screen that is displayed when a user logs in to the document management system 102 by using the client application 301. If a username and password are input in an authentication dialog 601 and a login button 602 is pressed, login processing on the document management system 102 is executed. If the login processing succeeds, the client application 301 is connected to the document management system 102 and becomes capable of document registration processing and search processing via the main UI 501 (FIG. 4). Once the login processing succeeds, the login processing from the authentication dialog 601 may be omitted in reconnecting to the document management system 102. If an authentication cancel button 603 is pressed, the authentication dialog 601 is closed without execution of the login processing.

Figure 6:
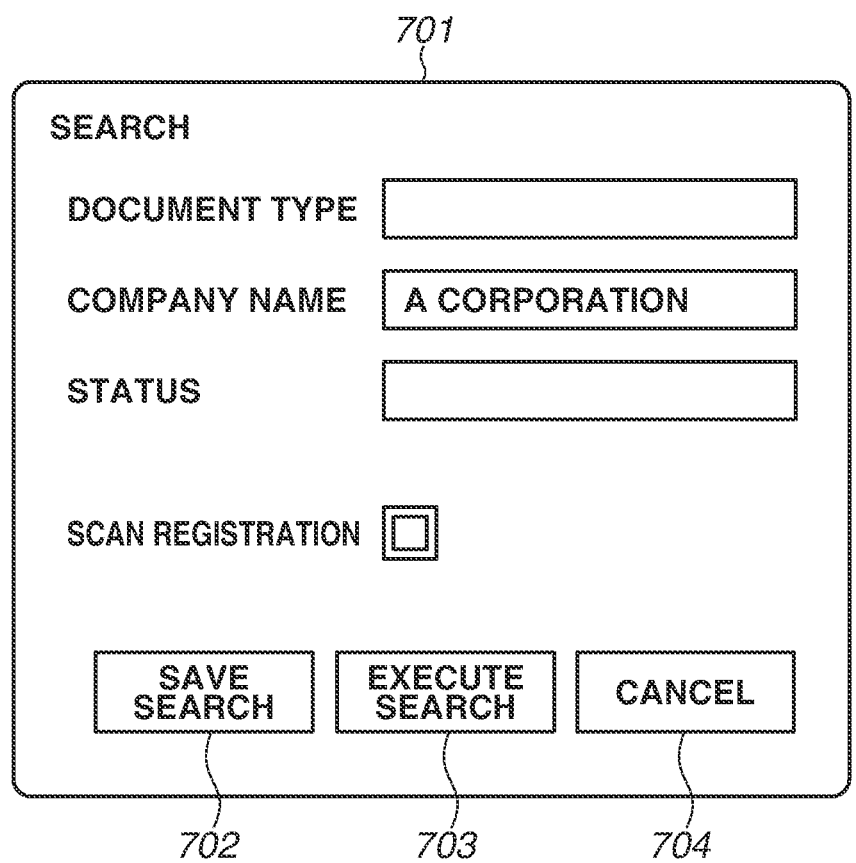
FIG. 6 is a diagram illustrating an example of a UI of a document search dialog of the client application for the document management system.

FIG. 6 illustrates an example of a search dialog 701 that is displayed in response to the pressing of the search execution UI 504. A search for documents can be performed by inputting setting values of the indexes "document type", "company name", and "status" in the storage area 503 into the search dialog 701. In the present exemplary embodiment, as in the example of FIG. 6, a search can be performed not only by the indexes but also by "scan registration" information indicating whether a document is registered by scanning. A search save button 702 can be used to save the search condition input to the search dialog 701. Saved search conditions are displayed in rows on the search execution UI 504. If a displayed search condition is selected, a search for documents can be performed again based on the saved search condition even if a search condition is not input into the search dialog 701. If a search execution button 703 is pressed, a search is executed under the search condition input to the search dialog 701. In the example of FIG. 6, a search for documents having "A Corporation" as the setting value of the "company name" index is started. The search result is displayed in the list display area 506. If a cancel button 704 is pressed, the search dialog 701 is closed without executing a search.

Figure 7:
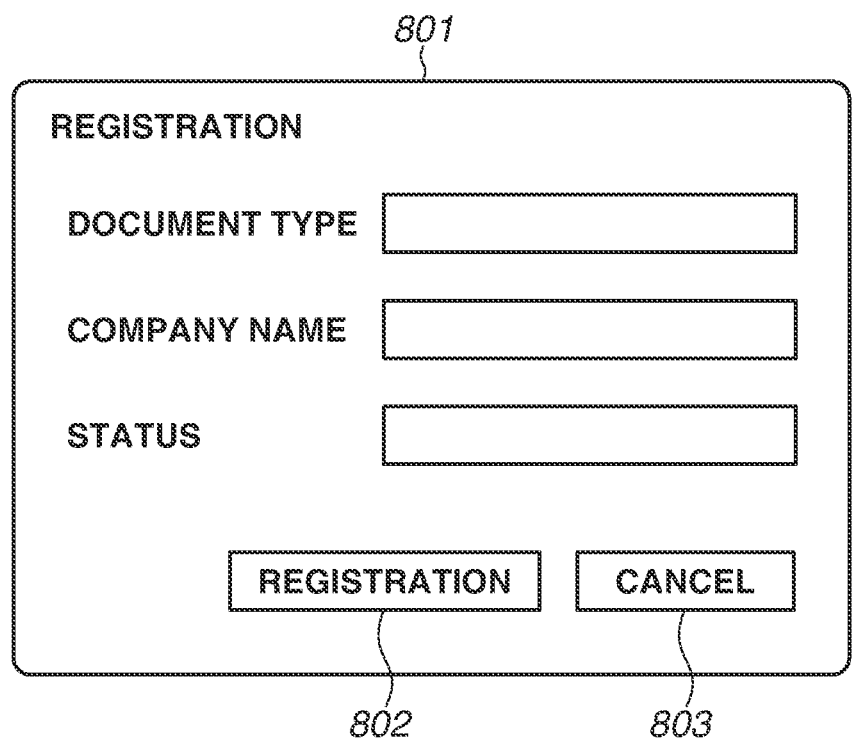
FIG. 7 is a diagram illustrating an example of a UI of a document registration dialog of the client application for the document management system.

FIG. 7 illustrates a document registration dialog 801 that is displayed when a document is registered in the storage area 503 of the document management system 102. The document registration dialog 801 is displayed when a document is dragged and dropped on the storage area 503.

If setting values are input to the indexes "document type", "company name", and "status" of the storage area 503 via the document registration dialog 801, the document and the indexes are registered in association with each other. If a registration button 802 is pressed, the registration processing is executed. If a registration cancel button 803 is pressed, the document registration dialog 801 is closed without performing registration.

FIG. 8 illustrates examples of a notification screen for making a notification that a document is registered via the document registration dialog 801. A notification screen 901 shows that scan data indexed with "estimate sheet", "A Corporation", and "not processed" is registered in the storage area 503. Processing for making a notification that scan data is registered will be described below.

If an icon 902 is selected, a document corresponding to the icon can be opened and edited. The selected document is regarded as being recognized by the user, and the display of the corresponding document is hidden from the notification screen 901. Processing for transitioning a screen from the notification screen 901 to a screen for editing the document will be described below.

FIG. 9A illustrates an example of a menu screen 1001 displayed on the liquid crystal panel 210 of the image processing apparatus 103. The menu screen 1001 displays a "copy" function button 1002, a "scan and send" function button 1003, and a "scan and register in document management system" function button 1004 as the buttons of functions executable by the image processing apparatus 103. If any one of the buttons 1002 to 1004 is pressed, the function corresponding to the description of the button is performed. If the "scan and register in document management system" function button 1004 is pressed, the device application 311 is activated. The storage area to be used when the "scan and register in document management system" function button 1004 is pressed may be specified when the device application 311 is installed on the image processing apparatus 103, or may be specified after the pressing of the "scan and register in document management system" function button 1004.

FIG. 9B illustrates an example of an authentication screen 1101 for the document management system 102, displayed on the liquid crystal panel 210 of the image processing apparatus 103. The authentication screen 1101 is displayed in response to the pressing of the "scan and register in document management system" function button 1004. If a username and password are input to the authentication screen 1101 and a login button 1102 is pressed, the login processing on the document management system 102 is executed. If the login succeeds, connection to the document management system 102 is enabled. The authentication screen 1101 may be configured to not be displayed each time reconnection to the document management system 102 is attempted after the login succeeds once. If an authentication cancel button 1103 of the device application 311 is pressed, the screen returns to the menu screen 1001 without performing the login processing.

FIG. 9C illustrates an example of a scan start screen 1201 displayed on the liquid crystal panel 210 of the image processing apparatus 103. The scan start screen 1201 is a screen to be started when a document to be registered in the document management system 102 is to be scanned. The scan start screen 1201 is displayed if the login button 1102 is pressed and the login succeeds. If a scan start button 1202 is pressed, the scan instruction unit 313 transmits a scan instruction to the scan unit 309. If a cancel button 1203 is pressed, the screen returns to the menu screen 1001 without performing a scan.

FIG. 9D illustrates an example of a document registration screen 1301 of the device application 311, displayed on the liquid crystal panel 210 of the image processing apparatus 103. The document registration screen 1301 is displayed in response to the scan start button 1202 having been pressed and the scan processing having been completed. The document registration screen 1301 includes a preview display area 1303 in which a preview of the scanned document is displayed, and an index display area 1302 that is a screen on which indexes are input.

The indexes input to the index display area 1302 are registered in the document management system 102 in association with the scan data. In FIG. 9D, indexes for a received and placed order storage area 403 that is set as the storage location of scan data in advance are displayed. FIG. 9D illustrates a state where "estimate sheet" is input as the "document type" index and "A Corporation" is input as the "company name" index by user operations.

A button 1304 is intended to scroll up the area displayed in the preview display area 1303. A button 1305 is intended to scroll down the area displayed in the preview display area 1303. A button 1306 is intended to enlarge the area displayed in the preview display area 1303. A button 1307 is intended to reduce the area displayed in the preview display area 1303.

If a registration button 1309 is pressed, the indexes input to the index display area 1302 are registered in the document management system 102 along with the scan data. If a registration cancel button 1310 is pressed, the screen returns to the menu screen 1001 without registering the scan data or the indexes.

Table 2 shows identifiers (document IDs) assigned by the document management system 102 in response to registration of scan data in the document management system 102. Usernames are those of the users having logged in to the document management system 102 when the scans are executed.

TABLE 2

| Scan Data List | |
| --- | --- |
| Document ID | Username |
| 000003 | taro |
| 000006 | hanako |

<Scan Data Registration Processing>

A flow for registering scan data in the document management system 102 from the device application 311 will be described with reference to FIG. 10. The present flow is started in response to the pressing of the registration button 1309 on the document registration screen 1301 of the device application 311 according to the first exemplary embodiment.

In step S1501, the device application 311 transmits scan data and its indexes to the document management system 102. Specifically, the scan information communication unit 315 transmits the scan data and the indexes input to the index display area 1302 to the document management system 102. The data transmission and reception unit 307 of the document management system 102 receives the transmitted data. In step S1502, the data management unit 306 stores the received data into the HDD 205. In step S1503, the data management unit 306 issues a document ID to the scan data stored. In step S1504, the data transmission and reception unit 307 transmits the document ID to the device application 311.

In step S1505, the device application 311 stores the document ID received from the document management system 102 and the login user. Specifically, the scan information management unit 314 stores the document ID obtained in step S1504 and the username used in logging in on the authentication screen 1101 into the HDD 205. Examples of the information stored here are shown in Table 2. The processing for registering scan data in the document management system 102 has been described above.

<Preprocessing of Scan Data Monitoring Processing>

Preprocessing of scan data monitoring processing will be described with reference to FIG. 11. The present flow illustrates processing after the login button 602 on the authentication dialog 601 of the client application 301 according to the first exemplary embodiment is pressed and the login on the document management system 102 via the client application 301 succeeds. The password and user ID input to the authentication dialog 601 are the same as those input to the authentication screen 1101 of the image processing apparatus 103.

In step S1601, the client application 301 obtains a list of printer objects installed on the OS.

In step S1602, the client application 301 determines whether there is a printer that is an in-house product in the obtained list of printer objects. Specifically, the client application 301 makes the determination based on whether configuration information about a printer object can be obtained via a printer object software developer kit (SDK) for in-house products. In a case where the client application 301 determines that there is a printer that is an in-house product in the obtained list of printer objects (YES in step S1602), the processing proceeds to step S1603. If not (NO in step S1602), the present processing ends.

In step S1603, the client application 301 obtains the Internet Protocol (IP) address of the printer that is an in-house product. Specifically, the client application 301 obtains the IP address from the printer object SDK for in-house products. In step S1604, the client application 301 determines whether there is a device application 311 connectable to the document management system 102. The device communication unit 304 communicates with the image processing apparatus 103 based on the IP address obtained in step S1603, and inquires whether a device application 311 connectable to the document management system 102 is installed. In a case where the client application 301 determines that there is a device application 311 connectable to the document management system 102 (YES in step S1604), the processing proceeds to step S1605. If not (NO in step S1604), the present processing ends.

In step S1605, the client application 301 monitors registration of scan data. Specifically, the device communication unit 304 regularly communicates with the scan information communication unit 315 of the device application 311.

The preprocessing of the scan data monitoring processing has been described above. If a plurality of device applications 311 connectable to the document management system 102 is found in step S1604, the client application 301 performs the scan data monitoring processing on each of the device applications 311.

<Scan Data Monitoring Processing>

The scan data monitoring processing (step S1605 in FIG. 11) by the client application 301 will be described with reference to FIG. 12.

In step S1701, the device communication unit 304 obtains the scan data list (Table 2) from the device application 311. The scan data list obtained in step S1701 may be in a data format such as a text format and a format in which a list of scan data is obtained as a single character string. In other words, the data format of the scan data list is not limited to any particular format, and the processing of step S1701 is performed by one communication even if the scan data list includes a plurality of items of data. In the present exemplary embodiment, the device communication unit 304 obtains the entire scan data list including a previously-obtained one.

In step S1702, the device communication unit 304 excludes information (document ID(s)) included in the scan data list obtained last time from the scan data list obtained in step S1701. In step S1703, the device communication unit 304 determines whether information left as a result of the exclusion of the previously obtained information includes login user information about a user having logged in to the document management system 102 via the client application 301. Specifically, suppose that the username of the current login user is "taro". Since the scan data list 1401 (Table 2) includes login user information "taro", the device communication unit 304 determines, in step S1703, that login user information is included. If the device communication unit 304 determines that login user information is not included (NO in step S1703), the processing proceeds to step S1707.

In a case where the device communication unit 304 determines that login user information is included (YES in step S1703), the processing proceeds to step S1704. In step S1704, the server communication unit 303 (client PC 101) transmits the document ID "000003" of the scan data to the data transmission and reception unit 307 (document management system 102). The data management unit 306 obtains the document information (including indexes) with the document ID "000003" from the HDD 205 of the document management system 102, and transmits the document information to the server communication unit 303 of the client PC 101. As can be seen from Table 1, "estimate sheet", "A Corporation", and "not processed" that are the indexes with the document ID "000003" are transmitted here.

In step S1706, the client application 301 displays the indexes obtained from the document management system 102 as a response to the transmission of the document ID. Specifically, the client application 301 displays that scan data is registered on the notification screen 901, as well as the indexes of the scan data. In step S1707, the client application 301 determines whether to continue the scan data monitoring processing. Whether to continue the scan data monitoring processing is determined based on whether the client application 301 is not terminated (window is not closed). In a case where the client application 301 determines that the scan data monitoring processing is to be continued (YES in step S1707), the processing returns to step S1701. In a case where the client application 301 determines that the scan data monitoring processing is not to be continued (NO in step S1707), the present processing ends. In a case where the processing returns from step S1707 to step S1701, the client application 301 may wait for a certain time before performing step S1701. The wait time may be settable by the user. The scan data monitoring processing has been described above.

<Processing for Displaying Edit Screen>

Figure 19:
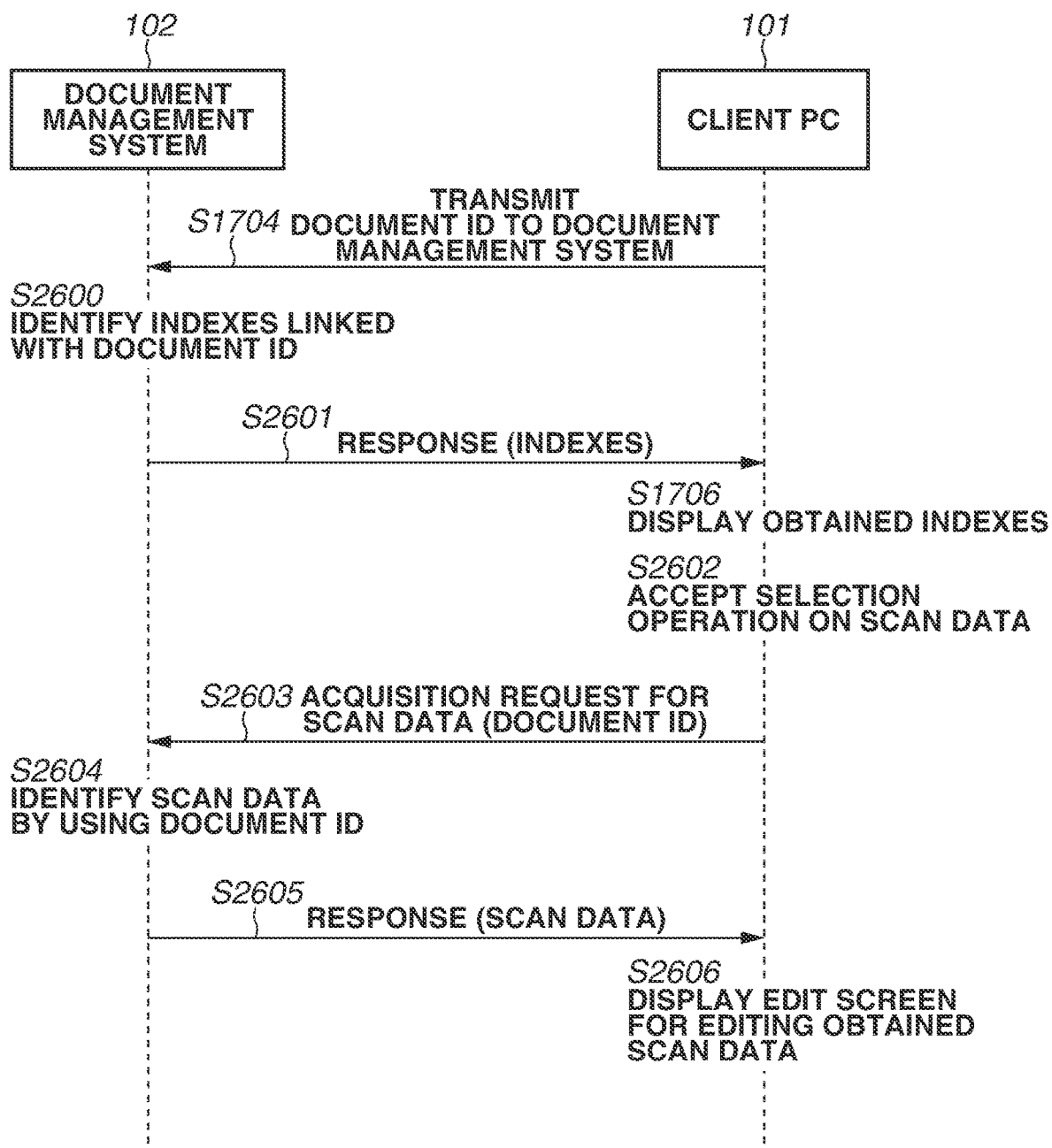
FIG. 19 is a sequence diagram illustrating processing for transmitting a document identifier (ID) and then transitioning a screen to an edit screen.

Processing from when the client PC 101 transmits the document ID to the document management system 102 (step S1704) to when the notification screen 901 is displayed and a scan data edit screen 2700 (FIG. 14) is displayed will be described with reference to FIG. 19. Processing steps already described above are designated by the same step numbers. A detailed description thereof will be omitted.

In step S1704, the client PC 101 transmits an acquisition request for acquiring indexes to the document management system 102 along with the document ID. In step S2600, the document management system 102 identifies the indexes linked with the received document ID. Table 1 shows the information to be referred to here.

In step S2601, the document management system 102 transmits the identified indexes to the client PC 101 as a response to the acquisition request in step S1704. In step S1706, the client PC 101 displays the notification screen 901. In step S2602, the client PC 101 accepts a selection operation on scan data via the notification screen 901. The mode of selection of the scan data by the user is not limited to any particular mode. In the present exemplary embodiment, the icon (□) 902 or the indexes displayed next to the icon 902 is/are selected.

In step S2603, the client PC 101 transmits an acquisition request for acquiring the scan data to the document management system 102 along with the document ID. If the document management system 102 hierarchically manages document data in folders, the acquisition request transmitted in step S2603 is transmitted to the file path of the scan data selected on the notification screen 901. In the present exemplary embodiment, the document management system 102 is configured to manage document data by indexes. The acquisition request transmitted in step S2603 then includes the document ID instead of a file path.

In step S2604, the document management system 102 searches for the document data managed in the document management system 102 by using the obtained document ID, and identifies the corresponding scan data.

Figure 14:
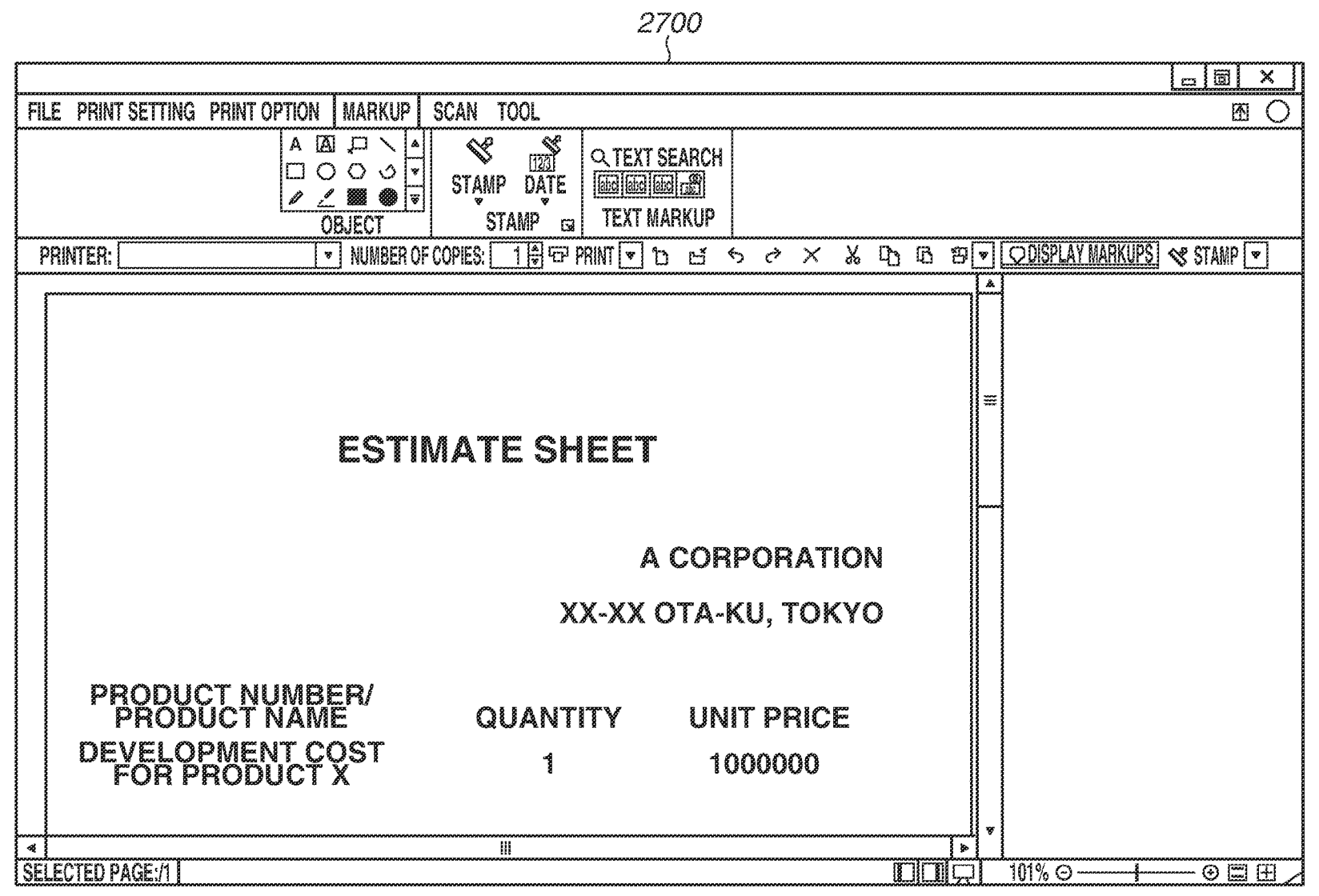

In step S2605, the document management system 102 transmits the scan data to the client PC 101 as a response to the acquisition request in step S2603. In step S2606, the client PC 101 displays the edit screen 2700 on which the scan data is to be edited. FIG. 14 illustrates an example of the edit screen 2700. The edit screen 2700 displays the scan data "estimate sheet" corresponding to the scan data selected on the notification screen 901. Icons on the tool bar of the edit screen 2700 are just examples.

The processing from when scan data is selected on the notification screen 901 to when the screen for editing the selected scan data is displayed has been described above.

<Document Data Monitoring Processing>

Figure 15:
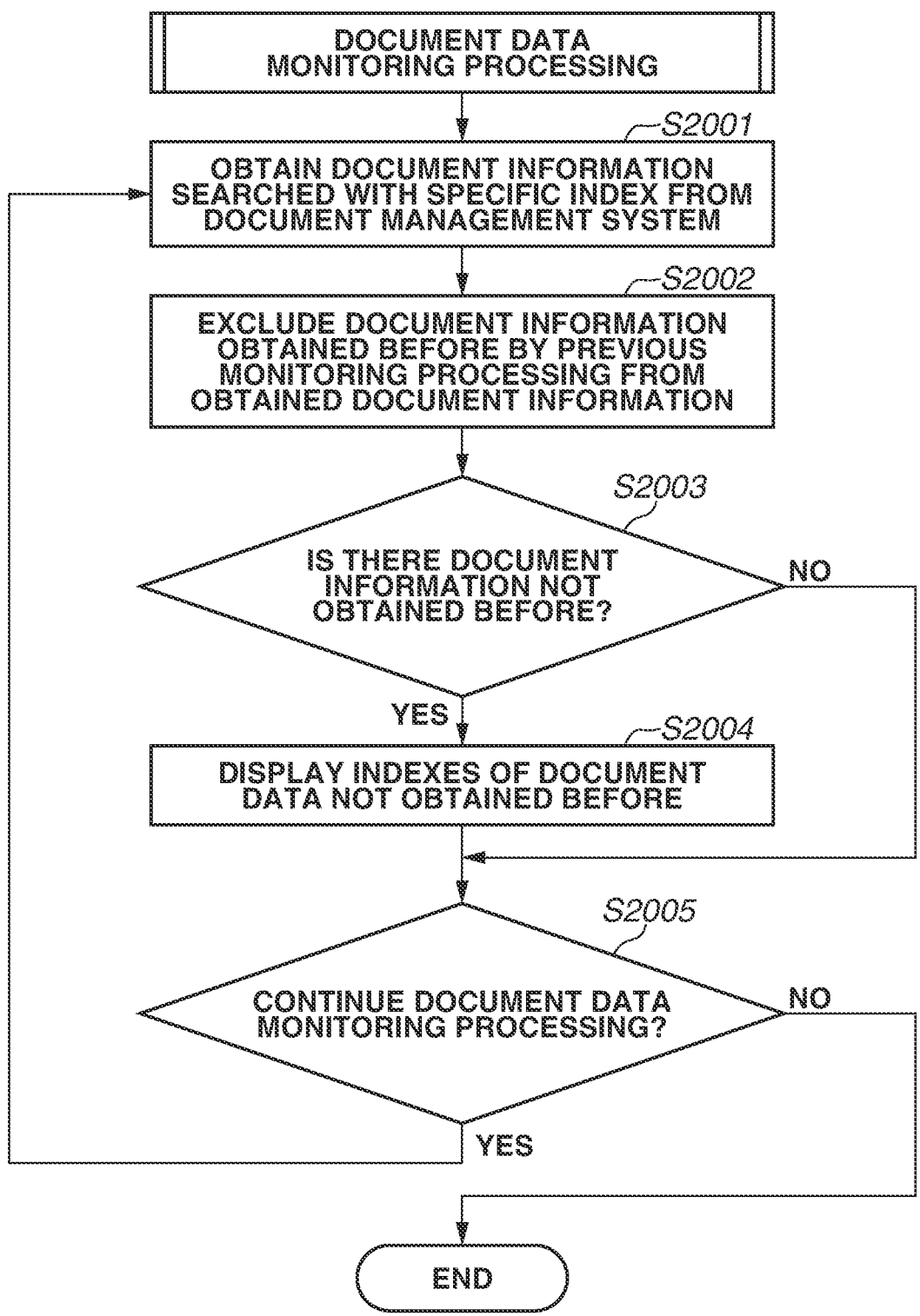
FIG. 15 is a flowchart illustrating document data monitoring processing.

Document data monitoring processing will be described with reference to FIG. 15. Document data here refers to document data having a specific index that is previously registered by the user as a notification target. By performing the processing of the present flow, the client application 301 displays a notification screen when corresponding document data is registered in the document management system 102. The document data monitoring processing of FIG. 15 is performed independently of the scan data monitoring processing illustrated in FIG. 12.

In step S2001, the server communication unit 303 obtains document information found as a result of a search with the specific index from the document management system 102. The document information includes a document ID and indexes. In step S2002, the client application 301 excludes document information obtained before by the previous monitoring processing from the document information obtained in step S2001. In step S2003, the client application 301 determines whether there is document information not obtained before. In a case where the client application 301 determines that there is document information not obtained before (YES in step S2003), the processing proceeds to step S2004. If not (NO in step S2003), the processing proceeds to step S2005.

In step S2004, the client application 301 displays the document information not obtained before on a notification screen. FIG. 8 illustrates an example of the notification screen (903). In a case where the specific index in the present flow is "order form", the notification screen 903 notifies a user that document data for which the index "order form" is set is registered in the document management system 102.

In step S2005, the client application 301 determines whether to continue the document data monitoring processing. Since the processing here is similar to that of step S1707, a detailed description thereof will be omitted. In a case where the client application 301 determines that the document data monitoring processing is to be continued (YES in step S2005), the processing returns to step S2001. In a case where the client application 301 determines that the document data monitoring processing is not to be continued (NO in step S2005), the present processing ends. The document data monitoring processing has been described above.

<Processing for Displaying Search Result of Document Data>

Processing in which the client application 301 searches for corresponding document data (for which the specific index is set) from the document management system 102 and displays the search result in the list display area 506 will be described with reference to FIG. 13. By the present processing, the "scan registration" field (FIG. 4) indicating that the document data found as a result of a search is scan data is displayed in addition to the search result. The processing of FIG. 13 is performed in response to the pressing of the search execution button 703 on the search dialog 701. The processing of FIG. 13 is performed independently of the scan data monitoring processing (FIG. 12).

In step S1801, the client application 301 obtains document information that satisfies the search condition from the document management system 102. In the example of the search dialog 701 (FIG. 6), an instruction to obtain document information with "A Corporation" in the "company name" index is transmitted from the server communication unit 303 (client PC 101) to the data transmission and reception unit 307 (document management system 102). The data management unit 306 obtains document information that satisfies the search condition from the HDD 205 (Table 1). The document management system 102 transmits the obtained document information to the server communication unit 303.

In step S1802, the client application 301 determines whether there is a device application 311 with scan data to be monitored. Specifically, the client application 301 checks for a device application 311 that has performed the processing of step S1605. In a case where the client application 301 determines that there is a device application 311 with scan data to be monitored (YES in step S1802), the processing proceeds to step S1803. In step S1803, the client application 301 adds information 507 indicating scan data to the "scan registration" field of the list display area 506.

In step S1804, the client application 301 obtains the scan data list 1401 from the device application 311. This processing is similar to the processing of step S1701. In step S1805, the client application 301 determines whether the same document information as the document information (document ID) obtained in step S1801 is included in the scan data list 1401 obtained in step S1804. Specifically, the client application 301 determines whether the same document ID is included in both the obtained document information and the obtained scan data list 1401. In a case where the client application 301 determines that the same document information is included (YES in step S1805) in the obtained document information and the obtained scan data list 1401, the processing proceeds to step S1806 since scan data that satisfies the user-set search condition is found to be present. In a case where the client application 301 determines that the same document information is not included (NO in step S1805), the processing proceeds to step S1807.

In step S1806, the client application 301 adds information (scan information) indicating scan data to the document data determined to be included in step S1805. In step S1807, the client application 301 displays the list display area 506 based on the indexes and scan information of the document data. FIG. 4 illustrates an example of the list display area 507 displayed here. It can be seen from FIG. 4 that the document data indexed with "estimate sheet", "A Corporation", and "not processed" is scan data obtained by the scan processing of the image processing apparatus 103.

In a case where the client application 301 determines, in step S1802, that there is no device application with scan data to be monitored (NO in step S1802), the processing proceeds to step S1808. In step S1808, the client application 301 displays only the document information (indexes) in the list display area 506 without displaying information in the "scan registration" field. The processing for displaying scan data that satisfies a search condition in the list display area has been described above.

Figure 12:
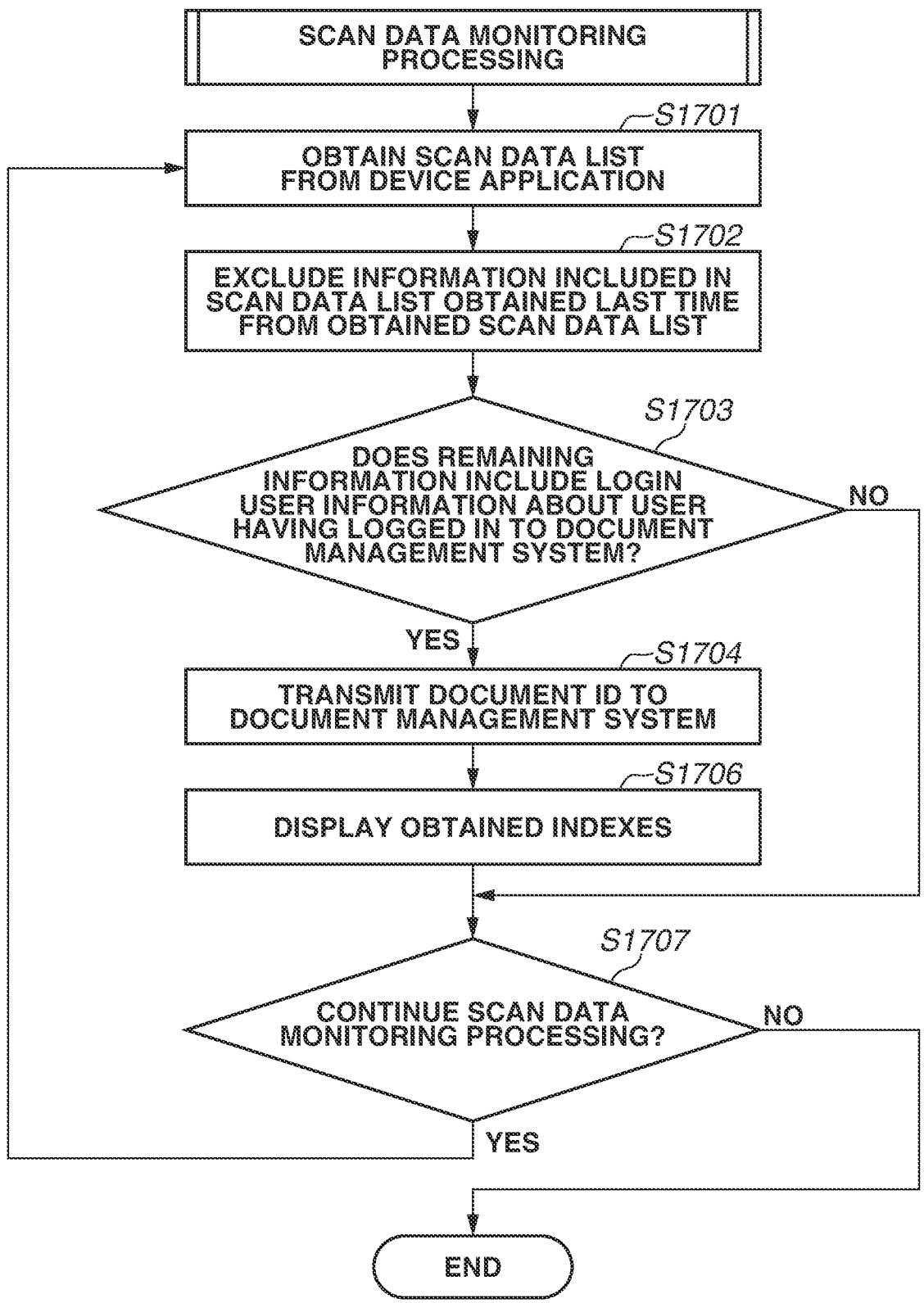
FIG. 12 is a flowchart illustrating the scan data monitoring processing.
Figure 13:
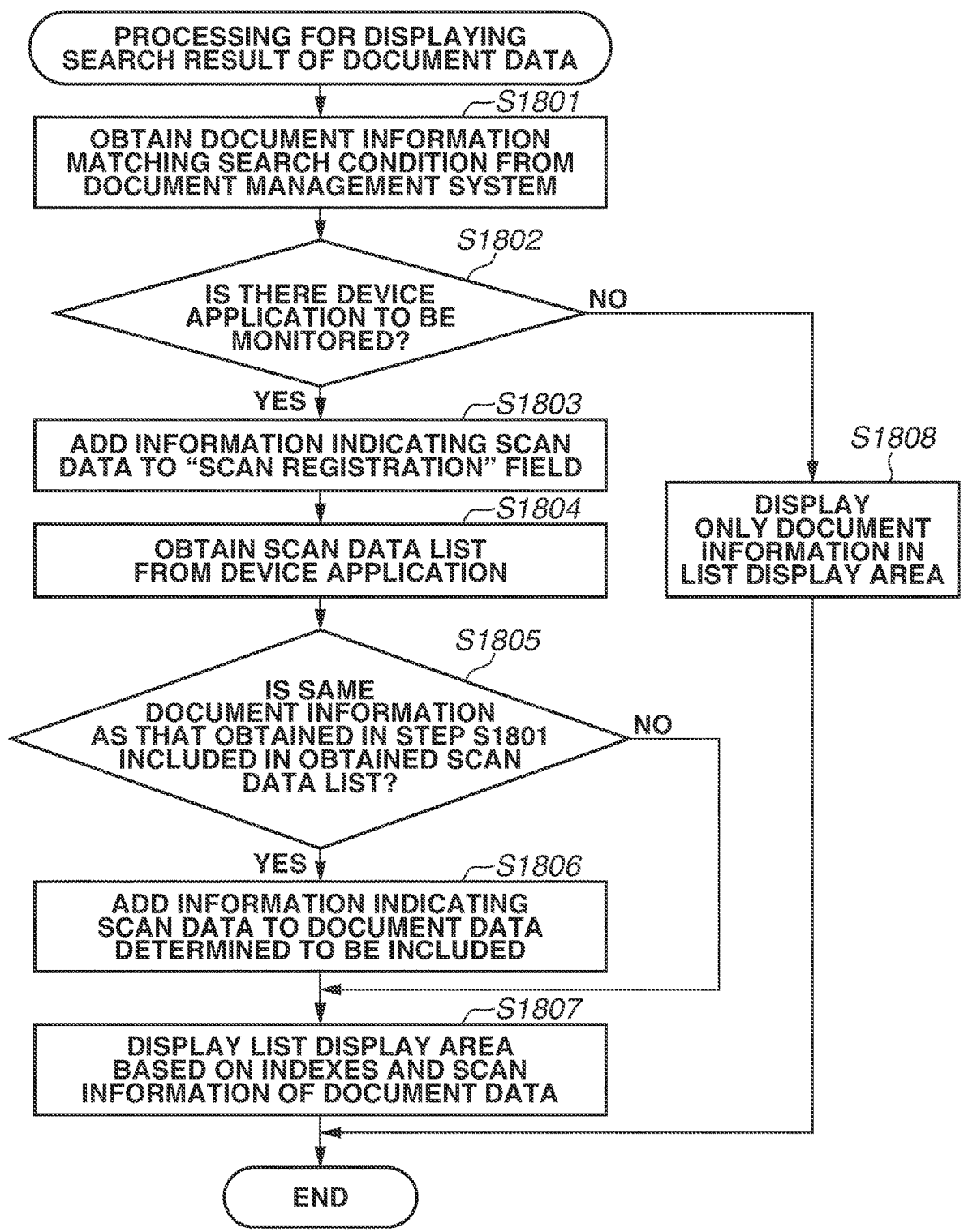
FIG. 13 is a flowchart illustrating processing for displaying a search result of document data.

By the processing of FIGS. 12 and 13, the client application 301 can make a notification of scan data registered in the document management system 102 or display the scan data as a search result.

A second exemplary embodiment will be described. Scan data monitoring processing (FIG. 12) and document data monitoring processing (FIG. 15) are executed independently of each other. Depending on document data of which a notification is to be made, it is troublesome that two types of notifications including a registration notification of scan data and a registration notification of document data having a specific index are displayed although the registration notifications are of the same document data. FIG. 8 illustrates an example of such notification screens (904). Two types of notifications are displayed even if there is only one piece of document data indexed with "order form", "B Corporation", and "not processed".

A notification screen 1901 is a schematic representation of a notification screen according to the second exemplary embodiment. It can be seen from such a single notification screen 1901 that document data indexed with "order form", "B Corporation", and "not processed" is scan data, and the document data includes the index "order form" that is set as a notification target.

In the present exemplary embodiment, a best mode for the foregoing situation is described with reference to the drawings. The present exemplary embodiment is basically based on the first exemplary embodiment. A description of portions similar to those of the first exemplary embodiment will be omitted.

Figure 16:
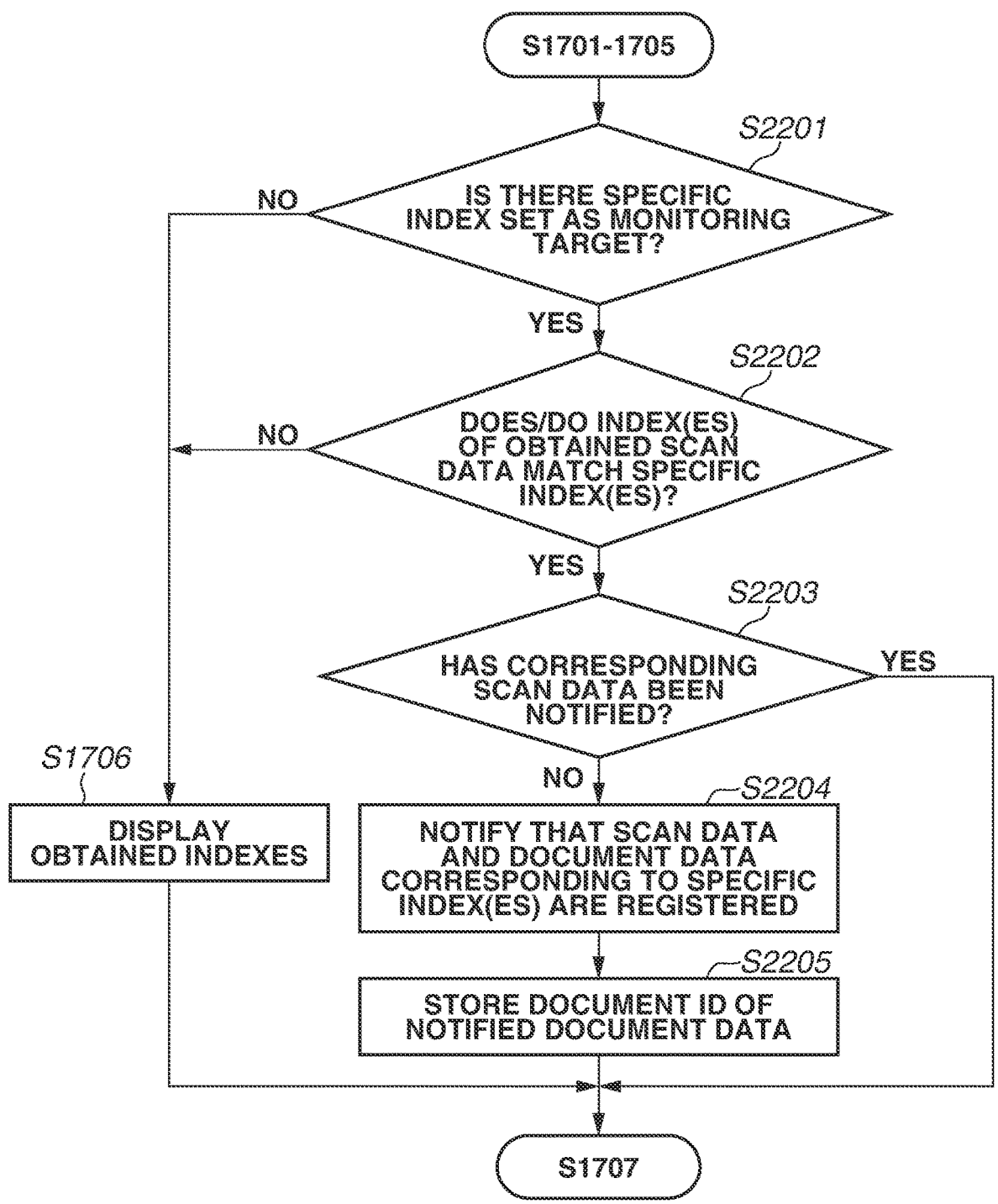
FIG. 16 is a flowchart illustrating notification processing according to a second exemplary embodiment.

Notification processing according to the second exemplary embodiment will be described with reference to FIG. 16. The present flow is executed instead of the notification of the indexes (step S1706) in the scan data monitoring processing (FIG. 12). Portions already described above are designated by the same step numbers. A detailed description thereof will be omitted.

The present flow is triggered by the acquisition of the indexes of the scan data by the client application 301 from the document management system 102 as a response to the acquisition request of step S1704.

In step S2201, the client application 301 determines whether there is a specific index set as a monitoring target. In other words, the client application 301 determines whether there is a specific index set as a target of the document data monitoring processing (FIG. 15). In a case where the client application 301 determines that there is a specific index set as a monitoring target (YES in step S2201), the processing proceeds to step S2202. In a case where the client application 301 determines that there is no specific index set as a monitoring target (NO in step S2201), the processing proceeds to step S1706. In step S1706, the client application 301 displays the indexes of the obtained scan data on the notification screen. Suppose here that "order form", "B Corporation", and "not processing" are set as specific indexes.

In step S2202, the client application 301 determines whether the indexes of the obtained scan data match the specific indexes. In a case where the client application 301 determines that the indexes match the specific indexes (YES in step S2202), the processing proceeds to step S2203. In a case where the client application 301 determines that the indexes do not match the specific indexes (NO in step S2202), the processing proceeds to step S1706. The indexes of the scan data here are "order form", "B Corporation", and "not processed" and thus match the specific indexes "order form", "B Corporation", and "not processed".

In step S2203, the client application 301 determines whether a notification of the corresponding scan data has been made. Specifically, the client application 301 refers to the document ID to be registered in step S2205 to be described below, and determines whether the document ID of the scan data obtained from the device application 311 is that of document data of which a notification has been made. In a case where the client application 301 determines that the notification of the scan data has not been made (NO in step S2203), the processing proceeds to step S2204. In a case where the client application 301 determines that the notification of the scan data has been made (YES in step S2203), the present processing ends.

In step S2204, i.e., in a case where the client application 301 determines that the notification of the scan data has not been made, the client application 301 makes a notification that scan data and document data corresponding to the specific indexes are registered. FIG. 8 illustrates an example of such a notification screen 1901. The notification screen 1901 displays that "scanned document/document type [order form] has been registered", since the document data indexed with "order form", "B Corporation", and "not processed" is the target of search by the specific indexes and is scan data.

In step S2205, the client application 301 stores the document ID of the document data of which a notification has been made in step S2204. The document ID of the document data of which a notification has been made is stored in step S2205, so that a notification of the document data, of which a notification is made when the processing of FIG. 16 is performed for the first time, is not to be made when the processing of FIG. 16 is performed for the second and subsequent times.

According to the present exemplary embodiment, if scan data satisfies a plurality of notification conditions, registration notifications of the scan data can be summarized into a single notification screen.

A third exemplary embodiment will be described. According to the methods of the foregoing exemplary embodiments, the device application 311 needs to regularly obtain scan data information for the sake of notification of scan data. This imposes a communication load on the image processing apparatus 103. In the third exemplary embodiment, a best mode for solving the foregoing issue is described with reference to the drawings. Processing steps already described above are designated by the same step numbers, and a detailed description thereof will be omitted.

TABLE 3

Client Application Information List

| IP address of client PC | Login username in document management system |
|---|---|
| xxx.xx.xxx | taro |
| yyy.yy.yyy | jiro |

TABLE 4

Unnotified Scan Data List

| Document ID | Login username |
|---|---|
| 000003 | taro |
| 000006 | jiro |

Figure 18:
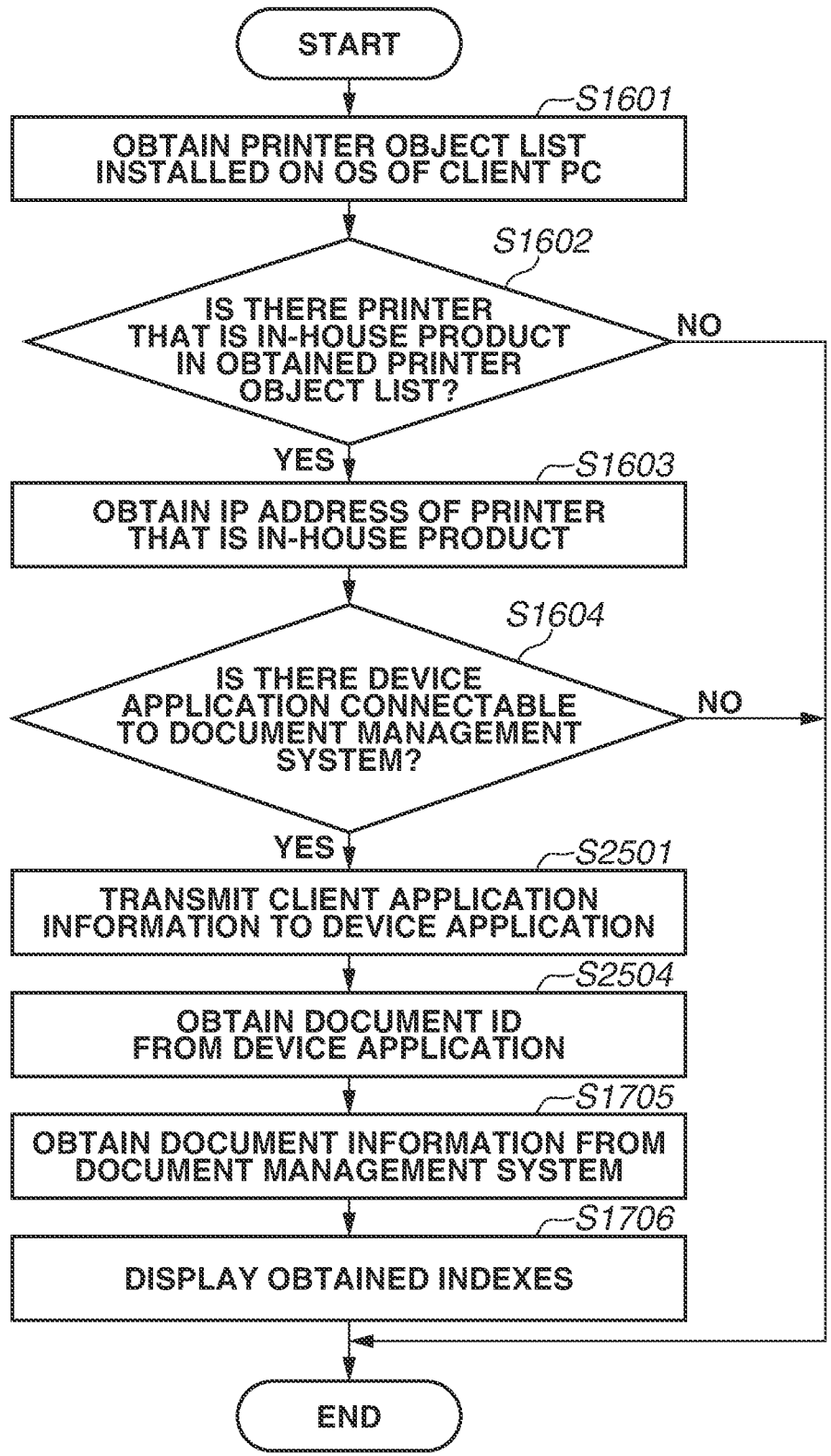
FIG. 18 is a flowchart illustrating processing after login to a document management system from a client application according to a third exemplary embodiment.

Tables 3 and 4 show examples of information that a device application 311 stores. Table 3 is a client application information list. The client application information list includes the IP addresses of client PCs 101 each including a client application 301 communicating with a device application 311, and login usernames in the document management system 102 connected to the client applications 301. Processing in which the device application 311 obtains the information shown in Table 3 will be described below (FIG. 18).

Table 4 is a list of document IDs of scan data of which the client applications 301 have not been notified and the login usernames in the document management system 102.

<Processing of Device Application According to Third Exemplary Embodiment>

Figure 17:
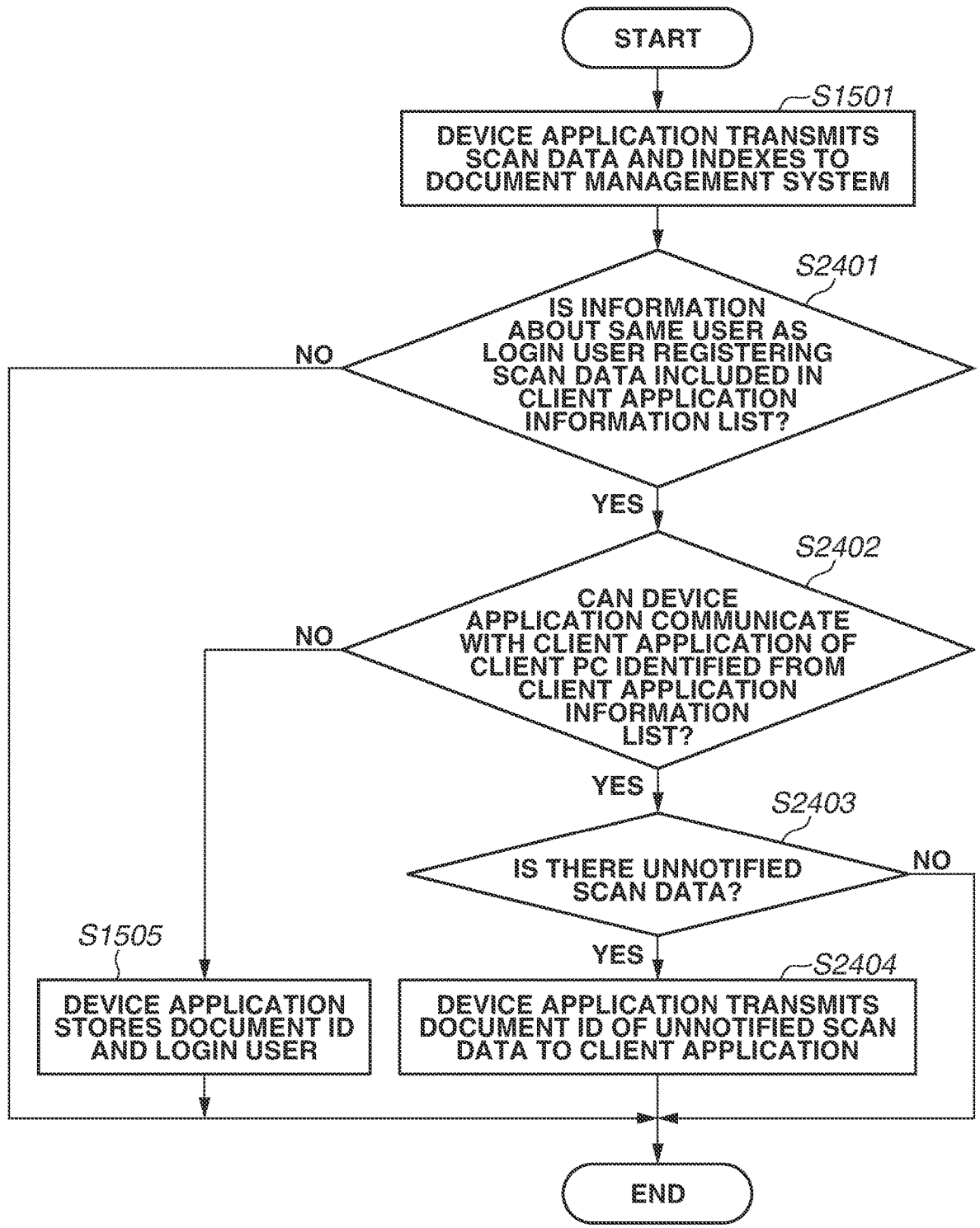
FIG. 17 is a flowchart illustrating processing for registering scan data in a document management system by a device application according to the second exemplary embodiment.

A flow for registering scan data in the document management system 102 from the device application 311 according to the present exemplary embodiment will be described with reference to FIG. 17. The present flow is performed in response to the pressing of a registration button 1309 of the device application 311 according to the third exemplary embodiment.

In step S2401, the device application 311 determines whether information about the same user as the login user who has registered the scan data is included in the client application information list (Table 3). Suppose, for example, that the login username of the login user who has registered the scan data in the document management system 102 is "taro". In such a case, the device application 311 determines that the information about the same user is included in the client application information list (YES in step S2401), and the processing proceeds to step S2402. In a case where the device application 311 determines that the information is not included in the client application information list (NO in step S2401), the present processing ends.

In step S2402, the device application 311 determines whether the device application 311 can communicate with the client application 301 of the client PC 101 identified from Table 3. Specifically, the device application 311 inquires of the client application 301 included in the client PC 101 having an IP address "xxx.xx.xxx" identified by the login username "taro" in Table 3 whether the device application 311 can communicate with the client application 301. In a case where the device application 311 determines that the device application 311 is able to communicate with the client application 301 (YES in step S2402), the processing proceeds to step S2403. In a case where the device application 311 determines that the device application 311 is unable to communicate with the client application 301 (NO in step S2402), the processing proceeds to step S1505. In step S1505, the device application 311 manages the scan data of which a notification has not been made (Table 4).

In step S2403, the device application 311 determines whether there is scan data of which the login user has not been notified, based on the client application information list (Table 3) and the unnotified scan data list (Table 4). In a case where the device application 311 determines that there is scan data of which the login user has not been notified (YES in step S2403), the processing proceeds to step S2404. If not (NO in step S2403), the present flow ends.

In step S2404, i.e., in a case where the device application 311 determines that there is scan data of which the login user has not been notified, the device application 311 transmits the document ID of the scan data of which the login user has not been notified to the client application 301. The processing ends.

The processing of the device application 311 according to the present exemplary embodiment has been described above. By the present processing, the device application 311 can identify scan data of which a client application 301 has not been notified based on information received from the client application 301, and transmit the document ID of the scan data to the client application 301.

<Notification Processing by Client Application According to Third Exemplary Embodiment>

Notification processing of the client application 301 according to the present exemplary embodiment will be described with reference to FIG. 18. Processing steps already described above are designated by the same step numbers, and a detailed description thereof will be omitted.

By the processing of steps S1601 to S1604, the client application 301 confirms that there is a device application 311 that can communicate with the document management system 102.

In step S2501, the client application 301 transmits client application information to the device application 311. Specifically, the client application 301 transmits the IP address of the client PC 101 and the login username in the document management system 102. The transmitted client application information corresponds to the client application information list (Table 3) managed by the device application 311.

In step S2504, the client application 301 obtains a document ID from the device application 311. The client application executes the processing of step S2504 in response to the execution of the processing of step S2404 in FIG. 17. After the processing of step S2504, in step S1705, the client application 301 obtains document information from the document management system 102. In step S1706, the client application 301 displays the indexes of the obtained document information. The present flow ends.

By the processing according to the present exemplary embodiment, the client application 301 can obtain scan data concerned from the image processing apparatus 103 without monitoring the device application 311. In this way, communication load due to monitoring can be reduced.

Other Embodiments

In the above exemplary embodiments, a notification of scan data that satisfies a search condition is made, or scan data that satisfies a search condition is displayed as a search result. Alternatively, a notification of document data associated with a specific index may not be made or document data associated with a specific index may not be displayed so that search conditions may be exclusively used.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-076458, filed Apr. 11, 2018, which is hereby incorporated by reference herein in its entirety.

What is claimed is:

1. An information processing system comprising:
a device having a scan function of scanning a document;
a client including an application to display information about scan data obtained by the scan function, the scan data being managed by a document management system,
wherein the device includes:
at least a first processor; and
at least a first memory coupled to the first processor, the first memory having first instructions that, when executed by the first processor, perform operations as:
a first acquisition unit configured to acquire an identifier of the scan data from the document management system after registration of the scan data in the document management system; and
a managing unit configured to manage user information of a user who has used the scan function to obtain the scan data during logging in to the device corresponding to the identifier, wherein the client includes:
at least a second processor; and
at least a second memory coupled to the second processor, the second memory having second instructions that, when executed by the second processor, perform operations as:
a first transmission unit configured to transmit user information of a user who has logged in to the application of the client, to the device;
a second acquisition unit configured to acquire from the device the identifier corresponding to the user information, wherein the identifier and the user information are managed by the managing unit;
a second transmission unit configured to transmit the identifier acquired by the second acquisition unit to the document management system; and
a providing unit configured to provide information indicating that the scan data identified by the identifier transmitted by the second transmission unit is registered in the document management system.

2. The information processing system according to claim 1,
wherein the second instructions further perform operations as a search unit configured to search for a device configured to communicate with the document management system, and
wherein the second acquisition unit is configured to, in a case where the device configured to communicate is found by the search unit, perform monitoring processing on the device configured to communicate, and acquire the identifier from the device on which the monitoring processing is performed.

3. The information processing system according to claim 2,
wherein the first instructions further perform operations as a management unit configured to manage user information about a login user and the identifier, the login user having logged in to the document management system via the device in executing the scan function for obtaining the scan data,
wherein the monitoring processing includes the client regularly communicating with the device and obtaining information managed by the management unit, and
wherein the second transmission unit is configured to transmit the identifier to the document management system, the identifier being identified based on the information obtained by the monitoring processing and the user information about the login user having logged in to the document management system via the client.

4. The information processing system according to claim 1,
wherein the first instructions further perform operations as a management unit configured to manage user information about a login user and the identifier, the login user having logged in to the document management system via the device in executing the scan function for obtaining the scan data,
wherein the second instructions further perform operations as a registration unit configured to register the user information about the login user having logged in to the document management system via the client in the device,
wherein the device is configured to identify the identifier of the scan data based on information managed by the management unit and the user information registered by the registration unit, and
wherein the identifier identified by the device is transmitted to the client so that the second acquisition unit of the client acquires the identifier identified by the device.

5. The information processing system according to claim 1,
wherein the second instructions further perform operations as:
a display unit configured to display scan data found by a user operation as a search result; and
a search unit configured to search for a device configured to communicate with the document management system, and
wherein the display unit is configured to, in a case where the device configured to communicate is found by the search unit, display information indicating that the scan data is scan data obtained by the scan function in addition to the information about the scan data.

6. The information processing system according to claim 5, wherein the information about the scan data includes an index and a setting value for the index, the index being an item of attribute information attached to the scan data.

7. The information processing system according to claim 1, wherein the identifier is issued by the document management system.

8. The information processing system according to claim 1, wherein the providing unit provides the information as a notification screen.

9. The information processing system according to claim 8, wherein the information processing system is configured to make a transition of a screen from the notification screen provided by a notification unit to an edit screen for editing the scan data identified by the identifier.

10. The information processing system according to claim 9, wherein the edit screen is displayed in a case where an identifier of scan data selected on the notification screen is transmitted to the document management system and scan data identified by the document management system by using the identifier of the selected scan data is transmitted to the client.

11. The information processing system according to claim 8, wherein the second instructions further perform operations as:
   a third acquisition unit configured to acquire an index of the scan data identified by the identifier transmitted by the second transmission unit; and
   a notification unit configured to provide the notification screen including at least the index acquired by the third acquisition unit.

12. The information processing system according to claim 11, wherein the second instructions further perform operations as:
   a monitoring unit configured to set a specific index as a monitoring target and monitor whether document data for which the specific index is set is registered in the document management system; and
   a determination unit configured to determine whether the index acquired by the third acquisition unit and the specific index are same,
   wherein the notification unit is configured to, in a case where the determination unit determines that the index and the specific index are the same, provide a notification that scan data identified by the identifier transmitted by the second transmission unit and for which the specific index is set is registered in the document management system.

13. The information processing system according to claim 9,
   wherein the notification screen includes at least an index of the scan data identified by the identifier, and
   wherein the edit screen is displayed in a case where the index displayed on the notification screen is selected by a user operation.

14. A method for controlling an information processing system including a device having a scan function of scanning a document, and a client including an application to display information about scan data obtained by the scan function, the scan data being managed by a document management system, the method comprising:
   acquiring an identifier of the scan data from the document management system after registration of the scan data in the document management system;
   managing user information of a user who has used the scan function to obtain the scan data during logging in to the device corresponding to the identifier;
   transmitting to the device, user information of a user who has logged in to the application of the client;
   acquiring from the device the identifier corresponding to the user information, wherein the identifier and the user information are managed by the managing;
   transmitting the acquired identifier to the document management system; and
   providing information indicating that the identified scan data identified by the identifier transmitted by the transmitting is registered in the document management system.

15. An information processing system comprising:
   a device having a scan function of scanning a document;
   a client including an application to display information about scan data obtained by the scan function, the scan data being managed by a document management system,
   wherein the device includes:
   at least a first processor; and
   at least a first memory coupled to the first processor, the first memory having first instructions that, when executed by the first processor, perform operations as:
   a first acquisition unit configured to acquire an identifier of the scan data from the document management system after registration of the scan data in the document management system; and
   a managing unit configured to manage user information of a user who has used the scan function to obtain the scan data during logging in to the device corresponding to the identifier,
   wherein the client includes:
   at least a second processor; and
   at least a second memory coupled to the second processor, the second memory having second instructions that, when executed by the second processor, perform operations as:
   a first transmission unit configured to transmit user information of a user who has logged in to the application of the client, to the device;
   a second acquisition unit configured to acquire from the device the identifier corresponding to the user information, wherein the identifier and the user information are managed by the managing unit;
   a second transmission unit configured to transmit the identifier acquired by the second acquisition unit to the document management system; and
   a third acquisition unit configured to acquire attribute information of the scan data identified by the identifier transmitted by the second transmission.

16. The information processing system according to claim 15, wherein the first instructions further perform operations as a provide unit configured to provide the attribute information acquired by the third acquisition unit.

* * * * *